(12) United States Patent
Gädt et al.

(10) Patent No.: US 9,777,133 B2
(45) Date of Patent: *Oct. 3, 2017

(54) ADDITIVE FOR HYDRAULICALLY SETTING COMPOUNDS

(71) Applicant: Construction Research & Technology, GmbH, Trostberg (DE)

(72) Inventors: Torben Gädt, Traunstein (DE); Harald Grassl, Feichten (DE); Alexander Kraus, Pittenhart (DE); Luc Nicoleau, Ludwigshafen am Rhein (DE); Martin Winklbauer, Halsbach (DE)

(73) Assignee: Construction Research & Technology, GmbH, Trostberg (DE)

(*) Notice: Subject to any disclaimer, the term of this patent is extended or adjusted under 35 U.S.C. 154(b) by 13 days.

This patent is subject to a terminal disclaimer.

(21) Appl. No.: 14/770,297

(22) PCT Filed: Feb. 26, 2014

(86) PCT No.: PCT/EP2014/053678
§ 371 (c)(1),
(2) Date: Aug. 25, 2015

(87) PCT Pub. No.: WO2014/131778
PCT Pub. Date: Sep. 4, 2014

(65) Prior Publication Data
US 2016/0002435 A1 Jan. 7, 2016

Related U.S. Application Data

(60) Provisional application No. 61/769,216, filed on Feb. 26, 2013.

(30) Foreign Application Priority Data

Feb. 26, 2013 (EP) .................................. 13156752

(51) Int. Cl.
| | | |
|---|---|---|
| *C08K 3/32* | (2006.01) | |
| *C08K 3/28* | (2006.01) | |
| *C08K 3/22* | (2006.01) | |
| *C04B 14/00* | (2006.01) | |
| *C04B 16/04* | (2006.01) | |
| *C04B 40/00* | (2006.01) | |
| *C08F 290/06* | (2006.01) | |
| *C04B 103/30* | (2006.01) | |

(52) U.S. Cl.
CPC .............. *C08K 3/32* (2013.01); *C04B 14/00* (2013.01); *C04B 16/04* (2013.01); *C04B 40/0039* (2013.01); *C08F 290/062* (2013.01); *C08K 3/22* (2013.01); *C08K 3/28* (2013.01); *C04B 2103/308* (2013.01); *C08K 2003/287* (2013.01); *C08K 2003/329* (2013.01)

(58) Field of Classification Search
CPC .... C08K 3/32; C08K 3/28; C08K 3/22; C04B 14/00; C04B 16/04

USPC ........................................................ 524/414, 5
See application file for complete search history.

(56) References Cited

U.S. PATENT DOCUMENTS

| | | | |
|---|---|---|---|
| 6,211,317 B1 | 4/2001 | Albrecht et al. | |
| 6,762,220 B1 | 7/2004 | Yaguchi et al. | |
| 7,026,402 B2 | 4/2006 | Schober et al. | |
| 7,375,163 B2 | 5/2008 | Schober et al. | |
| 7,842,766 B2 | 11/2010 | Kraus et al. | |
| 7,879,146 B2 | 2/2011 | Raki et al. | |
| 7,910,640 B2 | 3/2011 | Wieland et al. | |
| 8,653,186 B2 | 2/2014 | Nicoleau et al. | |
| 9,315,419 B2 * | 4/2016 | Gadt | C04B 24/267 |
| 2002/0007019 A1 | 1/2002 | Schober et al. | |
| 2004/0127607 A1 | 7/2004 | Schober et al. | |
| 2007/0032599 A1 | 2/2007 | Schober et al. | |
| 2008/0108732 A1 | 5/2008 | Wieland et al. | |
| 2011/0083586 A1 | 4/2011 | Raki et al. | |
| 2011/0166261 A1 | 7/2011 | Lorenz et al. | |
| 2011/0269875 A1 | 11/2011 | Nicoleau et al. | |
| 2012/0035301 A1 | 2/2012 | Vierle et al. | |
| 2012/0046392 A9 | 2/2012 | Lorenz et al. | |
| 2012/0046393 A1 | 2/2012 | Cha et al. | |
| 2013/0217808 A1 | 8/2013 | Sulser et al. | |
| 2015/0158768 A1 | 6/2015 | Gädt et al. | |

FOREIGN PATENT DOCUMENTS

| | | |
|---|---|---|
| DE | 10 2004 050 395 A1 | 4/2006 |
| EP | 0 753 488 A2 | 1/1997 |
| EP | 0 894 811 A1 | 2/1999 |
| EP | 1 136 508 A1 | 9/2001 |
| EP | 2 412 689 A2 | 2/2012 |
| EP | 2 463 314 A1 | 6/2012 |
| EP | 2 687 498 A1 | 1/2014 |
| EP | 2687498 * | 1/2014 |
| JP | 57-67057 A | 4/1982 |
| WO | WO 00/48961 | 8/2000 |
| WO | WO 2006/042709 A1 | 4/2006 |
| WO | WO 2006/089759 A1 | 8/2006 |
| WO | WO 2009/004348 A2 | 1/2009 |
| WO | WO 2010/026155 A1 | 3/2010 |
| WO | WO 2010/029117 A2 | 3/2010 |
| WO | WO 2010/066470 A1 | 6/2010 |

OTHER PUBLICATIONS

PCT/EP2014/053678—International Search Report, mailed Apr. 1, 2014. English Translation.

(Continued)

*Primary Examiner* — Deve E Valdez
(74) *Attorney, Agent, or Firm* — Curatolo Sidoti Co., LPA; Joseph G. Curatolo; Salvatore A. Sidoti

(57) ABSTRACT

The present invention relates to an additive for hydraulically setting compositions, comprising a colloidally disperse preparation of at least one water-soluble salt of a polyvalent metal cation, at least one compound capable of releasing an anion which forms a sparingly soluble salt with the polyvalent metal cation, and at least one polymeric dispersant which comprises anionic and/or anionogenic groups and polyether side chains.

17 Claims, No Drawings

(56) References Cited

OTHER PUBLICATIONS

PCT/EP2014/053678—International Written Opinion, mailed Apr. 1, 2014. English Translation.
PCT/EP2014/053678—International Preliminary Report on Patentability, issued Sep. 1, 2015. English Translation.
J. Plank, et al., "Experimental Determination of the Effective Anionic Charge Density of Polycarboxylate Superplasticizers in Cement Pore Solution", Cement and Concrete Research, Jan. 2009, pp. 1-5, vol. 39, Issue 1. Abstract Only.

* cited by examiner

ADDITIVE FOR HYDRAULICALLY SETTING COMPOUNDS

CROSS REFERENCE TO RELATED APPLICATIONS

This application is a national stage application of International Application No. PCT/EP2014/053678, filed 26 Feb. 2014, which claims priority from U.S. Provisional Patent Application No. 61/769,216, filed 26 Feb. 2013, and European Patent Application No. 13156752.1, filed 26 Feb. 2013, from which applications priority is claimed, and which are incorporated herein by reference.

The invention relates to an additive for hydraulically setting compositions which is suitable more particularly as a slump retainer.

Hydraulically setting compositions which comprise aqueous slurries of hydraulic and/or mineral binder with pulverulent inorganic and/or organic substances, such as clays, finely ground silicates, chalks, carbon blacks, or finely ground minerals, find broad application for example in the form of concretes, mortars or plasters.

It is known that hydraulically setting compositions are admixed, for the purpose of improving their processing properties—that is, kneadability, spreadability, sprayability, pumpability or fluidity—with additives which comprise polymeric dispersants. Additives of this kind are able to prevent the formation of agglomerates of solids, to disperse existing particles and those newly formed by hydration, and in this way to improve the processing properties. Additives which comprise polymeric dispersants are also particularly used specifically in the preparation of hydraulically setting compositions which comprise hydraulic and/or mineral binders such as (Portland) cement, slag sand, flyash, silica dust, metakaolin, natural pozzolans, burnt oil shale, calcium aluminate cement, lime, gypsum, hemihydrate, anhydrite or mixtures of two or more of these components.

In order to bring these hydraulically setting compositions, based on the stated binders, into a ready-to-use, processable form, it is generally necessary to use substantially more mixing water than is necessary for the subsequent hardening process. In the concrete structure, the cavities that are formed by the excess water, which subsequently evaporates, reduce the mechanical strength and resistance.

In order to reduce the fraction of excess water for a given processing consistency, and/or to improve the processing properties for a given water/binder ratio, additives are used which are identified generally as water reducers or plasticizers. Water reducers or plasticizers used in practice are more particularly polymers which are obtained by radical polymerization and are based on carboxyl-containing monomers and on polyethylene glycol-containing olefinic monomers, these polymers also being referred to as polycarboxylate ethers (abbreviated to "PCEs"). These polymers have a carboxyl-containing main chain with polyethylene glycol-containing side chains, and are also identified as comb polymers.

Divided off from the water reducers and plasticizers, which produce plasticization of freshly prepared concrete when added in relatively low amounts, are the consistency agents or slump-maintaining additives, referred to below as slump retainers, which achieve the same initial plasticization, only when added at relatively high levels, but bring about a constant slump flow spread over time. In contrast to the addition of water reducers, the addition of slump retainers allows good processing properties to be extended for up to, for example, 90 minutes after the mixing of the concrete, whereas with water reducers the processing properties deteriorate significantly after usually just 10 to 30 minutes.

A characteristic of the comb polymers known to date in the prior art is that depending on certain polymer-specific parameters it is possible deliberately to produce a water reducer or else a slump retainer. These polymer-specific parameters include the number of carboxyl groups or other acid groups, the number and length of the polyethylene glycol side chains, and the molecular weight. An adjustment between water reduction effect and slump retention effect through a corresponding selection of aforementioned polymer-specific parameters is nevertheless possible only a priori by means of synthetic or polymerization measures in the laboratory or in a chemical production plant. In these cases, corresponding types of acid monomers and polyethylene glycol-containing macromonomers are usually selected and polymerized in certain molar ratios. As a result of the stipulation made in the production process, the conversion of a water reducer into a slump retainer, or vice versa, at the site of the concrete processing is not possible according to the prior art.

In the art, generally speaking, water reducers and slump retainers are used in varying proportions in formulations. By means of formulating measures, however, the possibilities of improving slump retention are only very limited, it being difficult in particular to improve slump retention without at the same time adversely affecting other properties of the concrete. For instance, a formulation with slump retainers does result in better slump retention, as disclosed for example in WO 2009/004348 in connection with phosphonates and in JP 57067057A in connection with sugars. However, the retention of the slump is bought only at the expense of poorer early strengths.

Other methods for retaining slump in a cementitious binder dispersion have been disclosed in the prior art over time:

The use of high-performance plasticizers based on polycarboxylate ether with hydrolysable acrylic esters, known as "dynamic superplasticizers", as described in EP 1 136 508 A1 and WO 2010/029117. This technology allows the time-controlled adsorption of plasticizer polymers on to the surfaces of the cement particles, the retention of the slump being improved by hydrolysis of corresponding carboxylic acid derivatives (e.g. acrylic esters) in the alkaline medium represented by the concrete. The "dynamic superplasticizer" properties as well are laid down by synthetic or polymerizational measures within the laboratory or in a chemical production plant, and cannot be adjusted flexibly at the site of the concrete processing.

Furthermore, use is made of crosslinked polycarboxylate ethers which are crosslinked by monomers having more than one polymerizable function, such as di(meth)acrylates, for example. Under the strongly basic conditions of the cementitious pore water, the crosslinking structural units undergo hydrolysis, crosslinking is halted, and the non-crosslinked (co)polymer, which is active as a plasticizer, is released over time (WO2000/048961). The properties of these crosslinked polycarboxylate ethers as well are laid down by synthetic or polymerizational measures in the laboratory or in a chemical production plant, and cannot be adjusted flexibly at the site of the concrete processing. Moreover, the risk exists of an unintended premature hydrolysis during the storage of the products.

U.S. Pat. No. 7,879,146 B2 discloses the preparation of double layer hydroxides based on divalent metal cations (e.g. $Ni^{2+}$, $Zn^{2+}$, $Mn^{2+}$ and/or $Ca^{2+}$) and trivalent metal cations (e.g. $Al^{3+}$, $Ga^{3+}$, $Fe^{3+}$ and/or $Cr^{3+}$). The double layer hydroxides are able to intercalate anions such as nitrates, hydroxides, carbonates, sulfates and chlorides. The inorganic products are treated at elevated temperature (65° C.) for a number of hours and then dried under reduced pressure at 100° C. In a subsequent ion exchange operation, organic molecules are intercalated into the thus-prepared double layer hydroxides, examples of such molecules being naphthalenesulfonates, derivatives of nitrobenzoic acid, salicylic acid, citric acid, polyacrylic acids, polyvinyl alcohol and a superplasticizer based on a sodium salt of polynaphthalenesulfonic acid (PNS). The polynaphthalenesulfonic acid (PNS) sodium salts modified inorganically by double layer hydroxides produce only a slightly improved slump retention in a mortar test. For many applications, this improvement is not sufficient.

EP 2 412 689 describes a nano-hybrid additive for concrete, comprising a layered double hydroxide and a polyurethane copolymer, the additive being prepared by mixing the two components and by hydrothermal treatment. The additive is said to prevent the breakdown of underwater concrete induced by chloride ions and to prevent the decomposition of concrete as a result of the use of deicing agents, such as calcium chloride, in winter. Disadvantageous are the long synthesis times of >6 h and the required high temperatures of 80 to 100° C. for the hydrothermal preparation of the double layer hydroxides. Furthermore, with this method as well, the properties of the hybrid are necessarily laid down in a complicated synthesis procedure in a chemical production plant.

European patent application 12177399.8, moreover, describes a slump retention additive that comprises an aqueous, colloidally disperse preparation of at least one salt of a polyvalent metal cation and of at least one polymeric dispersant, the polymeric dispersant comprising anionic and/or anionogenic groups and polyether side chains.

The diverse requirements imposed on the performance profile of concretes are subject to nationally specific regulations and standardizations, and are heavily dependent on the conditions prevailing at the particular building site, such as the weathering conditions, for instance. Slump retention in particular is heavily dependent on the conditions prevailing at the respective construction site.

Since the weathering conditions prevailing from one construction site to another may be very different, there is a need within the construction industry to eliminate the above-described deficiencies of the prior art. The invention is therefore based on the object of providing efficient slump retainers. These slump retainers ought to be able to ensure sufficient slump retention under the conditions prevailing on the construction site, without adversely affecting other concrete properties, such as the early strength, for example.

This object is achieved by the following embodiments:

1. Additive for hydraulically setting compositions, comprising a colloidally disperse, more particularly aqueous colloidally disperse, preparation of at least one water-soluble salt of a polyvalent metal cation, at least one compound able to release an anion which forms a sparingly soluble salt with the polyvalent metal cation, and at least one polymeric dispersant which comprises anionic and/or anionogenic groups and polyether side chains, the metal cation being present in an amount such that the following relation according to formula (a) is greater than 0 and less than or equal to 1:

$$0 < \frac{\sum_i z_{K,i} \times n_{K,i}}{\sum_j z_{s,j} \times n_{s,j}} \leq 1 \quad \text{(a)}$$

and where $z_{K,i}$ is the amount of the charge number of the polyvalent metal cation, $n_{K,i}$ is the number of moles of the polyvalent metal cation, $z_{S,j}$ is the amount of the charge number of the anionic and anionogenic group present in the polymeric dispersant, and $n_{S,j}$ is the number of moles of the anionic and anionogenic group present in the polymeric dispersant, the indices i and j are independent of one another and are an integer greater than 0, where i is the number of different polyvalent metal cations and j is the number of different anionic and anionogenic groups present in the polymeric dispersant.

$z_{K,i}$ is defined such that the charge number for metal cations always relates to the full formal charge, i.e. $z_{Fe}(FeCl_3)=3$, $z_{Fe}(FeCl_2)=2$.

The charge number $z_{S,j}$ stands for the amount of the formal charge in the case of the maximal deprotonation of the anionic and anionogenic group present in the polymeric dispersant, i.e. in the case, for example, of the groups ($-OPO_3H_2$), ($-OPO_3H^-$), ($-OPO_3^{2-}$), ($-PO_3H_2$), ($-PO_3H^-$), and ($-PO_3^{2-}$), z is 2, and in the case of the groups ($-COOH$) and ($-COO^-$), z is 1.

2. Additive according to embodiment 1, the polyvalent metal cation being selected from $Al^{3+}$, $Fe^{3+}$, $Fe^{2+}$, $Zn^{2+}$, $Mn^{2+}$, $Mg^{2+}$, $Sr^{2+}$, $Ba^{2+}$ and mixtures thereof.

3. Additive according to embodiment 2, the polyvalent metal cation being selected from $Al^{3+}$, $Fe^{3+}$, $Fe^{2+}$, $Ca^{2+}$ and mixtures thereof.

4. Additive according to any of the preceding embodiments, the polyvalent metal cation and the anion being present in amounts which are calculated according to the following formulae:

$$0 < \frac{\sum_i z_{K,i} \times n_{K,i}}{\sum_j z_{s,j} \times n_{s,j}} \leq 1 \quad \text{(a)}$$

$$0 < \frac{\sum_l z_{A,l} \times n_{A,l}}{\sum_i z_{K,i} \times n_{K,i}} \leq 3 \quad \text{(b)}$$

The relation according to formula (b) preferably being between 0.01 and 2, further preferably between 0.05 and 1.5, more preferably between 0.1 and 1.0, still more preferably between 0.15 and 0.8 and very preferably between 0.2 and 0.75, and $z_{K,i}$ is the amount of the charge number of the polyvalent metal cation, $n_{K,i}$ is the number of moles of the polyvalent metal cation, $z_{S,j}$ is the charge number of the anionic and anionogenic groups present in the polymeric dispersant, $n_{S,j}$ is the number of moles of the anionic and anionogenic groups present in the polymeric dispersant, $z_{A,l}$ is the charge number of the anion, $n_{A,l}$ is the number of moles of the anion, the indices i, j and l are independent of one another and are an integer greater than 0, where i is the number of different polyvalent metal cations, j is the number of different anionic and anionogenic groups present in the polymeric dispersant, and l is the number of different anions which are able to form a sparingly soluble salt with the metal cation.

The charge number $z_{A,l}$ stands for the amount of the formal charge in the case of maximum deprotonation, i.e., in the case, for example, of the groups ($H_3PO_4$) and ($Na_3PO_4$), $z_{PO4}$ is 3, or in the case of ($Na_2CO_3$), $z_{CO3}$ is 2. In the case of aluminate, $z_{AlO2}(NaAlO_2)=z_{AlO2}(NaAl(OH)_4)=1$; in the case of silicate, for all silicates species, $z_{SiO3}(Na_2SiO_3)=2$.

5. Additive according to any of the preceding embodiments, the ratio according to formula (a) being in the range from 0.1 to 1, preferably 0.3 to 1, more preferably 0.5 to 0.94, with further preference 0.7 to 0.94 and with particular preference in the range from 0.8 to 0.9.

6. Additive according to any of the preceding embodiments, the anion being selected from carbonate, oxalate, silicate, phosphate, polyphosphate, phosphite, borate, aluminate and sulfate.

7. Additive according to embodiment 6, the anion being selected from carbonate, silicate, phosphate, aluminate and mixtures thereof.

8. Additive according to embodiment 7, the anion being phosphate.

9. Additive according to embodiment 7, the anion being aluminate.

10. Additive according to any of the preceding embodiments, the solids fraction being 1% to 45% by weight, preferably 5% to 40% by weight, more preferably 15% to 35% by weight.

11. Additive according to any of the preceding embodiments, the polyvalent metal cation and the anion being present in amounts which are calculated according to the following formula:

$$0.25 < \frac{\left(\sum_i z_{K,i} \times n_{K,i}\right)^2}{\left(\sum_l z_{A,l} \times n_{A,l}\right)\left(\sum_j z_{s,j} \times n_{s,j}\right)} < 25 \quad (c)$$

where the ratio according to formula (c) is preferably in the range from 0.4 to 20 and more preferably in the range from 1 to 10.

12. Additive according to any of the preceding embodiments, having a high storage stability under atmospheric pressure, the storage stability being measured at 0 to 40° C., preferably at 5 to 35° C.

13. Additive according to any of the preceding embodiments, the additive comprising substantially no preparation of an $Al^{3+}$, $Ca^{2+}$ or $Mg^{2+}$ salt and of a silicate.

14. Additive according to embodiment 13, the sum total in the numerator of the formula (a) being at least 200 times greater than the part of the sum total in the numerator of the formula (a) that is accounted for by the preparations of the $Al^{3+}$, $Ca^{2+}$ or $Mg^{2+}$ salts and of the silicate.

15. Additive according to embodiment 14, the sum total in the numerator of the formula (a) being at least 1000 times greater than the part of the sum total in the numerator of the formula (a) that is accounted for by the preparations of the $Al^{3+}$, $Ca^{2+}$ or $Mg^{2+}$ salts and of the silicate.

16. Additive according to any of the preceding embodiments, additionally comprising at least one neutralizing agent.

17. Additive according to embodiment 16, the neutralizing agent being an alkali metal hydroxide, an organic monoamine, an organic diamine, an organic polyamine or ammonia.

18. Additive according to embodiment 17, the neutralizing agent is selected from sodium hydroxide, potassium hydroxide, ammonia, monohydroxy-$C_1$-$C_4$-alkylamines, dihydroxy-$C_1$-$C_4$-alkylamines, trihydroxy-$C_1$-$C_4$-alkylamines, mono-$C_1$-$C_4$-alkylamines, di-$C_1$-$C_4$-alkylamines, tri-$C_1$-$C_4$-alkylamines, $C_1$-$C_4$-alkylenediamines, (tetrahydroxy-$C_1$-$C_4$-alkyl)-$C_1$-$C_4$-alkylenediamines, polyethylenamines, polypropylenamines and mixtures thereof.

19. Additive according to embodiment 18, the neutralizing agent being selected from sodium hydroxide, potassium hydroxide, ammonia, monohydroxy-$C_1$-$C_4$-alkylamines, di-hydroxy-$C_1$-$C_4$-alkylamines, trihydroxy-$C_1$-$C_4$-alkylamines, $C_1$-$C_4$-alkylenediamines, polyethylenamines and mixtures thereof.

20. Additive according to embodiment 19, the neutralizing agent being selected from sodium hydroxide, potassium hydroxide, ammonia, ethylenediamine, monoethanolamine, diethanolamine, triethanolamine, polyethylenamines and mixtures thereof.

21. Additive according to embodiment 20, the neutralizing agent being selected from sodium hydroxide and potassium hydroxide and mixtures thereof.

22. Additive according to embodiment 21, the neutralizing agent being sodium hydroxide.

23. Additive according to any of the preceding embodiments, having a pH of 2 to 11.5, preferably 3 to 10 and more particularly 3 to 9.

24. Additive according to any of the preceding embodiments, the polymeric dispersant comprising as anionic or anionogenic group at least one structural unit of the general formulae (Ia), (Ib), (Ic) and/or (Id):

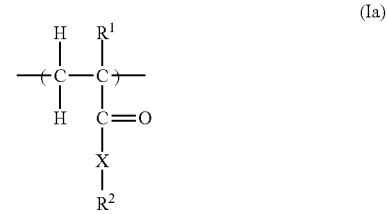
(Ia)

in which $R^1$ is H or an unbranched or branched $C_1$-$C_4$ alkyl group, $CH_2COOH$ or $CH_2CO$—X—$R^2$;

X is NH—$(C_nH_{2n})$, $O(C_nH_{2n})$ with n=1, 2, 3 or 4, the nitrogen atom or the oxygen atom, respectively, being attached to the CO group, or is a chemical bond, preferably X=chemical bond or $O(C_nH_{2n})$;

$R^2$ is OM, $PO_3M_2$, or O—$PO_3M_2$; with the proviso that X is a chemical bond when $R^2$ is OM;

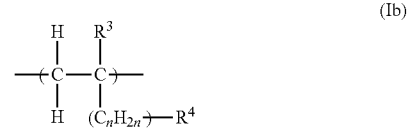
(Ib)

in which $R^3$ is H or an unbranched or branched $C_1$-$C_4$ alkyl group;

n is 0, 1, 2, 3 or 4;

$R^4$ is $PO_3M_2$, or O—$PO_3M_2$;

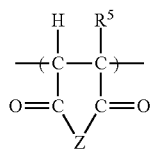
(Ic)

in which
$R^5$ is H or an unbranched or branched $C_1$-$C_4$ alkyl group;
Z is O or $NR^7$; and
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4;

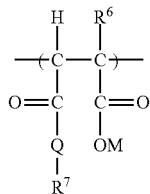
(Id)

in which
$R^6$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$ or $(C_nH_{2n})$—O-$(AO)_\alpha$—$R^9$,
A is $C_xH_{2x}$ with x=2, 3, 4 or 5 or is $CH_2CH(C_6H_5)$;
α is an integer from 1 to 350, preferably 5-150;
$R^9$ is H or an unbranched or branched $C_1$-$C_4$ alkyl group;
n is 1, 2, 3 or 4, preferably 1, 2 or 3; and
each M in the abovementioned formulae independently of any other is H or one cation equivalent.

25. Additive according to embodiment 24, the polymeric dispersant comprising as anionic or anionogenic group at least one structural unit of the formula (Ia) in which $R^1$ is H or $CH_3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

26. Additive according to embodiment 24, the polymeric dispersant comprising as anionic or anionogenic group at least one structural unit of the formula (Ia) in which $R^1$ is H or $CH_3$ and $XR^2$ is OM or X is $O(C_nH_{2n})$ with n=1, 2, 3 or 4, more particularly 2, and $R^2$ is O—$PO_3M_2$.

27. Additive according to any of the preceding embodiments, the polymeric dispersant comprising as polyether side chain at least one structural unit of the general formulae (IIa), (IIb), (IIc) and/or (IId):

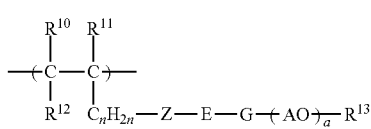
(IIa)

in which
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5 or is $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, CO—$NH_2$ and/or $COCH_3$;

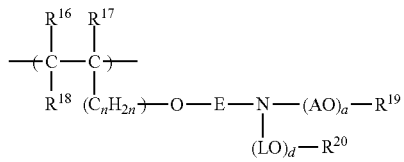
(IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene or 1,4-phenylene or is a chemical bond;
A is $C_xH_{2x}$ with x=2, 3, 4 or 5 or is $CH_2CH(C_6H_5)$;
L is $C_xH_{2x}$ with x=2, 3, 4 or 5 or is $CH_2$—$CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched or branched $C_1$-$C_4$ alkyl group; and
n is 0, 1, 2, 3, 4 or 5;

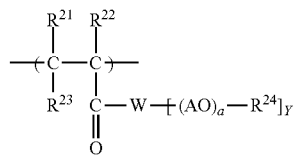
(IIc)

in which
$R^{21}$, $R^{22}$ and $R^{23}$ independently of one another are H or an unbranched or branched $C_1$-$C_4$ alkyl group;
W is O, $NR^{25}$ or N
Y is 1, if W=O or $NR^{25}$, and is 2 if W=N;
A is $C_xH_{2x}$ with x=2, 3, 4 or 5 or is $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

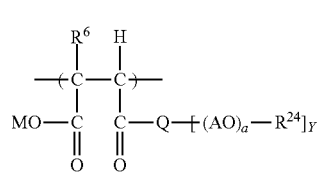
(IId)

in which
R$^6$ is H or an unbranched or branched C$_1$-C$_4$ alkyl group;
Q is NR$^{10}$, N or O;
Y is 1 if Q=O or NR$^{10}$, and is 2 if Q=N;
R$^{10}$ is H or an unbranched or branched C$_1$-C$_4$ alkyl group;
R$^{24}$ is H or an unbranched or branched C$_1$-C$_4$ alkyl group;
A is C$_x$H$_{2x}$ with x=2, 3, 4 or 5, or CH$_2$C(C$_6$H$_5$)H;
a is an integer from 2 to 350; and
M is H or one cation equivalent.

28. Additive according to embodiment 27, the polymeric dispersant comprising as polyether side chain:
(a) at least one structural unit of the formula (IIa) in which R$^{10}$ and R$^{12}$ are H, R$^{11}$ is H or CH$_3$, E and G together are a chemical bond, A is C$_x$H$_{2x}$ with x=2 and/or 3, a is 3 to 150, and R$^{13}$ is H or an unbranched or branched C$_1$-C$_4$ alkyl group; and/or
(b) at least one structural unit of the formula (IIb) in which R$^{16}$ and R$^{18}$ are H, R$^{17}$ is H or CH$_3$, E is an unbranched or branched C$_1$-C$_6$ alkylene group, A is C$_x$H$_{2x}$ with x=2 and/or 3, L is C$_x$H$_{2x}$ with x=2 and/or 3, a is an integer from 2 to 150, d is an integer from 1 to 150, R$^{19}$ is H or an unbranched or branched C$_1$-C$_4$ alkyl group, and R$^{20}$ is H or an unbranched or branched C$_1$-C$_4$ alkyl group; and/or
(c) at least one structural unit of the formula (IIc) in which R$^{21}$ and R$^{23}$ are H, R$^{22}$ is H or CH$_3$, A is C$_x$H$_{2x}$ with x=2 and/or 3, a is an integer from 2 to 150, and R$^{24}$ is H or an unbranched or branched C$_1$-C$_4$ alkyl group; and/or
(d) at least one structural unit of the formula (IId), in which R$^6$ is H, Q is O, R$^7$ is (C$_n$H$_{2n}$)—O-(AO)$_a$—R$^9$, n is 2 and/or 3, A is C$_x$H$_{2x}$ with x=2 and/or 3, a is an integer from 1 to 150 and R$^9$ is H or an unbranched or branched C$_1$-C$_4$ alkyl group.

29. Additive according to any of embodiments 27 or 28, the polymeric dispersant comprising at least one structural unit of the formula (IIa) and/or (IIc).

30. Additive according to any of embodiments 1 to 23, the polymeric dispersant being a polycondensation product comprising structural units (III) and (IV):

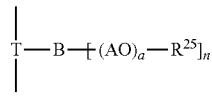

(III)

in which
T is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and the proviso that n is 1 if B is NH or O;
A is C$_x$H$_{2x}$ with x=2, 3, 4 or 5 or is CH$_2$CH(C$_6$H$_5$);
a is an integer from 1 to 300;
R$^{25}$ is H, a branched or unbranched C$_1$ to C$_{10}$ alkyl radical, C$_5$ to C$_8$ cycloalkyl radical, aryl radical, or heteroaryl radical having 5 to 10 ring atoms, of which 1 or 2 atoms are heteroatoms selected from N, O and S;
the structural unit (IV) being selected from the structural units (IVa) and (IVb):

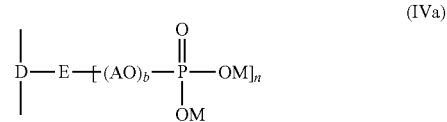

(IVa)

in which
D is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
E is N, NH or O, with the proviso that n is 2 if E is N and with the proviso that n is 1 if E is NH or O;
A is C$_x$H$_{2x}$ with x=2, 3, 4 or 5 or is CH$_2$CH(C$_6$H$_5$);
b is an integer from 1 to 300;
M independently at each occurrence is H or one cation equivalent;

(IVb)

in which
V is a substituted or unsubstituted phenyl radical, substituted or unsubstituted naphthyl radical and is optionally substituted by 1 or two radicals selected from R$^8$, OH, OR$^8$, (CO)R$^8$, COOM, COOR$^8$, SO$_3$R$^8$ and NO$_2$, preferably OH, OC$_1$—C$_4$-alkyl and C$_1$-C$_4$-alkyl;
R$^7$ is COOM, OCH$_2$COOM, SO$_3$M or OPO$_3$M$_2$;
M is H or one cation equivalent; and
R$^8$ is C$_1$-C$_4$ alkyl, phenyl, naphthyl, phenyl-C$_1$-C$_4$ alkyl or C$_1$-C$_4$ alkylphenyl.

31. Additive according to embodiment 30, T being a substituted or unsubstituted phenyl radical or naphthyl radical, E being NH or O, A being C$_x$H$_{2x}$ with x=2 and/or 3, a being an integer from 1 to 150, and R$^{25}$ being H, or a branched or unbranched C$_1$ to C$_{10}$ alkyl radical.

32. Additive according to embodiment 30, D being a substituted or unsubstituted phenyl radical or naphthyl radical, E being NH or O, A being C$_x$H$_{2x}$ with x=2 and/or 3, and b being an integer from 1 to 150.

33. Additive according to any of embodiments 30 to 32, T and/or D being phenyl or naphthyl which is substituted by 1 or 2 C$_1$-C$_4$ alkyl, hydroxy or 2 C$_1$-C$_4$ alkoxy groups.

34. Additive according to embodiment 30, V being phenyl or naphthyl which is substituted by 1 or 2 C$_1$-C$_4$ alkyl, OH, OCH$_3$ or COOM, and R$^7$ being COOM or OCH$_2$COOM.

35. Additive according to any of embodiments 30 to 33, the polycondensation product comprising a further structural unit (V) of the formula

(V)

in which
R$^5$ and R$^6$ may be identical or different and H, CH$_3$, COOH or are a substituted or unsubstituted phenyl or naphthyl group.

36. Additive according to embodiment 35, in which $R^5$ and $R^6$ may be identical or different and are H, $CH_3$, or COOH, more particularly H, or one of the radicals $R^5$ and $R^6$ is H and the other is $CH_3$.

37. Additive according to any of embodiments 1 to 29, the polymeric dispersant comprising units of the formulae (I) and (II), more particularly of the formulae (Ia) and (IIa).

38. Additive according to any of embodiments 1 to 29, the polymeric dispersant comprising structural units of the formulae (Ia) and (IIc).

39. Additive according to any of embodiments 1 to 29, the polymeric dispersant comprising structural units of the formulae (Ic) and (IIa).

40. Additive according to any of embodiments 1 to 29, the polymeric dispersant comprising structural units of the formulae (Ia), (Ic) and (IIa).

41. Additive according to any of embodiments 1 to 29, the polymeric dispersant being constructed from (i) anionic or anionogenic structural units derived from acrylic acid, methacrylic acid, maleic acid, hydroxyethyl acrylate phosphoric esters and/or hydroxyethyl methacrylate phosphoric esters, hydroxyethyl acrylate phosphoric diesters, and/or hydroxyethyl methacrylate phosphoric diesters, and (ii) polyether side chain structural units derived from $C_1$-$C_4$-alkylpolyethylene glycol acrylic esters, polyethylene glycol acrylic esters, $C_1$-$C_4$-alkylpolyethylene glycol methacrylic esters, polyethylene glycol methacrylic esters, $C_1$-$C_4$-alkylpolyethylene glycol acrylic esters, polyethylene glycol acrylic esters, vinyloxy-$C_2$-$C_4$-alkylenepolyethylene glycol, vinyloxy-$C_2$-$C_4$-alkylenepolyethylene glycol $C_1$-$C_4$-alkyl ethers, allyloxypolyethylene glycol, allyloxypolyethylene glycol $C_1$-$C_4$-alkyl ethers, methallyloxypolyethylene glycol, methallyloxypolyethylene glycol $C_1$-$C_4$-alkyl ethers, isoprenyloxypolyethylene glycol and/or isoprenyloxypolyethylene glycol $C_1$-$C_4$-alkyl ethers.

42. Additive according to embodiment 41, the polymeric dispersant being constructed from structural units (i) and (ii) derived from
(i) hydroxyethyl acrylate phosphoric esters and/or hydroxyethyl methacrylate phosphoric esters and (ii) $C_1$-$C_4$-alkylpolyethylene glycol acrylic esters and/or $C_1$-$C_4$-alkylpolyethylene glycol methacrylic esters; or
(i) acrylic acid and/or methacrylic acid and (ii) $C_1$-$C_4$-alkylpolyethylene glycol acrylic esters and/or $C_1$-$C_4$-alkylpolyethylene glycol methacrylic esters; or
(i) acrylic acid, methacrylic acid and/or maleic acid and (ii) vinyloxy-$C_2$-$C_4$-alkylenepolyethylene glycol, allyloxypolyethylene glycol, methallyloxypolyethylene glycol and/or isoprenyloxypolyethylene glycol.

43. Additive according to embodiment 41, the polymeric dispersant being constructed from structural units (i) and (ii) derived from
(i) hydroxyethyl methacrylate phosphoric esters and (ii) $C_1$-$C_4$-alkylpolyethylene glycol methacrylic esters or polyethylene glycol methacrylic esters; or
(i) methacrylic acid and (ii) $C_1$-$C_4$-alkylpolyethylene glycol methacrylic esters or polyethylene glycol methacrylic esters; or
(i) acrylic acid and maleic acid and (ii) vinyloxy-$C_2$-$C_4$-alkylenepolyethylene glycol or
(i) acrylic acid and maleic acid and (ii) isoprenyloxypolyethylene glycol or
(i) acrylic acid and (ii) vinyloxy-$C_2$-$C_4$-alkylenepolyethylene glycol or
(i) acrylic acid and (ii) isoprenyloxypolyethylene glycol or
(i) acrylic acid and (ii) methallyloxypolyethylene glycol or
(i) maleic acid and (ii) isoprenyloxypolyethylene glycol or
(i) maleic acid and (ii) allyloxypolyethylene glycol or
(i) maleic acid and (ii) methallyloxypolyethylene glycol.

44. Additive according to any of embodiments 24 to 29, the molar ratio of the structural units (I):(II) being 1:4 to 15:1, more particularly 1:1 to 10:1.

45. Additive according to any of embodiments 30 to 36, the molar ratio of the structural units (III):(IV) being 4:1 to 1:15, more particularly 2:1 to 1:10.

46. Additive according to any of embodiments 30 to 36, the molar ratio of the structural units (III+IV):(V) being 2:1 to 1:3, more particularly 1:0.8 to 1:2.

47. Additive according to any of embodiments 30 to 36 or 46, the polymeric dispersant being constructed from structural units of the formulae (III) and (IV) in which T and D are phenyl or naphthyl, the phenyl or naphthyl being optionally substituted by 1 or 2 $C_1$-$C_4$ alkyl, hydroxy or 2 $C_1$-$C_4$ alkoxy groups, B and E are O, A is $C_xH_{2x}$ with x=2, a is 3 to 150, more particularly 10 to 150, and b is 1, 2 or 3.

48. Additive according to any of the preceding embodiments, obtainable by precipitating the salt of the polyvalent metal cation in the presence of the polymeric dispersant, to give a colloidally disperse preparation of the salt.

49. Additive according to any of the preceding embodiments, obtainable by dispersing a freshly precipitated salt of the polyvalent metal cation in the presence of the polymeric dispersant, to give a colloidally disperse preparation of the salt.

50. Additive according to any of embodiments 47 to 48, the colloidally disperse preparation being admixed with a neutralizing agent.

51. Additive according to any of embodiments 1 to 49, obtainable by peptizing a hydroxide and/or oxide of the polyvalent metal cation with an acid, to give a colloidally disperse preparation of the salt of the polyvalent metal cation.

52. Additive according to embodiment 51, the acid being selected from boric acid, carbonic acid, oxalic acid, silicic acid, sulfuric acid, polyphosphoric acid, phosphoric acid and/or phosphorous acid.

53. Additive according to embodiment 51, the acidic form of the polymeric dispersant being used for peptizing the hydroxide and/or oxide of the polyvalent metal cation.

54. Additive according to any of the preceding embodiments, comprising a preparation of an $Al^{3+}$ salt.

55. Additive according to any of embodiments 1 to 53, comprising a preparation of an $Fe^{3+}$ salt.

56. Additive according to any of embodiments 1 to 53, comprising a preparation of an $Fe^{2+}$ salt.

57. Additive according to any of embodiments 1 to 53, comprising a preparation of a $Ca^{2+}$ salt.

58. Additive according to any of the preceding embodiments, the anion being selected from carbonate, silicate, phosphate and aluminate, more particularly phosphate and aluminate, and mixtures thereof.

59. Additive according to embodiment 58, the anion being phosphate and the relation according to formula (b) being in the range from 0.01 to 2.

60. Additive according to embodiment 58, the anion being phosphate and the relation according to formula (b) being in the range of 0.1 and 1.0.

61. Additive according to embodiment 58, the anion being phosphate and the relation according to formula (b) being in the range from 0.2 to 0.75.

62. Additive according to embodiment 58, the anion being aluminate and the relation according to formula (b) being in the range from 0.01 to 2.

63. Additive according to embodiment 58, the anion being aluminate and the relation according to formula (b) being in the range from 0.1 to 1.0.

64. Additive according to embodiment 58, the anion being aluminate and the relation according to formula (b) being in the range from 0.2 to 0.75.

65. Additive according to any of the preceding embodiments in the form of a powder.

66. Process for preparing the additive for hydraulically setting compositions according to any of embodiments 1 to 65, by precipitating the salt of the polyvalent metal cation in the presence of the polymeric dispersant, to give a colloidally disperse preparation of the salt.

67. Process for preparing the additive for hydraulically setting compositions according to any of embodiments 1 to 65, by dispersing a freshly precipitated salt of the polyvalent metal cation in the presence of the polymeric dispersant, to give a colloidally disperse preparation of the salt.

68. Process according to embodiment 66 or 67, additionally comprising a drying step, the additive being obtained in the form of a powder.

69. Use of the additive according to any of embodiments 1 to 65 as a slump retainer in water-containing building material mixtures which comprise a hydraulic binder.

70. Use according to embodiment 69, the hydraulic binder being selected from (Portland) cement, slag sand, flyash, silica dust, metakaolin, natural pozzolans, burnt oil shale, calcium aluminate cement, and mixtures of two or more of these components.

71. Building material mixture comprising an additive according to any of embodiments 1 to 65 and a binder selected from (Portland) cement, slag sand, flyash, silica dust, metakaolin, natural pozzolans, burnt oil shale, calcium aluminate cement, and mixtures thereof.

72. Building material mixture according to embodiment 71, comprising as hydraulic binder (Portland) cement.

73. Building material mixture according to embodiment 71, comprising substantially no (0% to 5% by weight) Portland cement.

In all embodiments according to the invention, the polyvalent metal cation is present in substochiometric or stochiometric amount, calculated as cation equivalents, based on the sum total of the anionic and anionogenic groups in the polymeric dispersant.

The sum of the product of charge number $z_{S,j}$ and number of mole $n_{S,j}$ in mmol/g in the polymeric dispersant can be determined by various known methods, as for example by determination by charge density titration with a polycation as described for example in J. Plank et al., Cem. Concr. Res. 2009, 39, 1-5. Moreover, the skilled person familiar with the state of the art is capable of determining this value in a simple calculation (see calculation for example 478) from the initial weighings of monomers for the synthesis of the polymeric dispersant. Lastly it is possible to obtain the numerical value of the sum of the product of $z_s$ and $n_s$ experimentally, by determining the ratios of the polymer units by means of nuclear magnetic resonance spectroscopy (NMR). This is done by utilizing in particular the integration of the signals in the $^1$H-NMR spectrum of a dissolved polymeric dispersant.

The polyvalent metal cation is preferably selected from $Al^{3+}$, $Fe^{3+}$, $Fe^{2+}$, $Zn^{2+}$, $Mn^{2+}$, $Cu^{2+}$, $Ca^{2+}$, $Mg^{2+}$, $Sr^{2+}$, $Ba^{2+}$ and mixtures thereof, more preferably selected from $Al^{3+}$, $Fe^{3+}$, $Fe^{2+}$, $Mn^{2+}$, $Zn^{2+}$, $Ca^{2+}$ and mixtures thereof, very preferably selected from $Al^{3+}$, $Fe^{3+}$, $Fe^{2+}$, $Ca^{2+}$ and mixtures thereof. The particularly preferred metal cation is $Ca^{2+}$.

The counteranion of the water-soluble salt of the polyvalent metal cation is preferably selected such that the salts are readily water-soluble, the solubility under standard conditions of 20° C. and atmospheric pressure being preferably greater than 10 g/l, more preferably greater than 100 g/l and very preferably greater than 200 g/l. The numerical value of the solubility relates here to the total mass of dissolved metal cations and counteranions that comes about in the equilibrium state when the water-soluble salt is dissolved in deionized water at 20° C. under atmospheric pressure. The solubility takes no account of the effects of protonation equilibriums (pH) and complexation equilibriums, i.e. the value for the solubility applies to the pH obtained on dissolution.

The counteranion is preferably singly charged and selected from nitrate, acetate, formate, hydrogensulfate, halide, halate, cyanide, azide, cyanate, thiocyanate, fulminate, methane-sulfonate and/or amidosulfonate. With particular preference the counteranion is selected from chloride and nitrate. With very particular preference the counteranion is nitrate. Double salts as well can be used as salts of polyvalent metal cations. Double salts are salts which have two or more different cations. An example is alum (KAl($SO_4$)$_2$·12$H_2O$), which is suitable as an aluminum salt. The salts of polyvalent metal cations with the aforementioned counteranions are readily water-soluble and hence especially suitable, since relatively high concentrations of the aqueous metal salt solutions (as reactant) can be established.

Anionic groups are the deprotonated acid groups present in the polymeric dispersant. Anionogenic groups are the acid groups present in the polymeric dispersant. Groups which are both anionic and anionogenic, such as partially deprotonated polybasic acid residues, are assigned exclusively to the anionic groups when forming the sum of the number of moles of the anionic and anionogenic groups present in the polymeric dispersant.

The term "different kinds of polyvalent metal cations" refers to polyvalent metal cations of different elements. Furthermore, the term "different kinds of polyvalent metal cations" also refers to metal cations of the same element with different charge numbers.

Anionic and anionogenic groups of the polymeric dispersant are said to be of different kinds when they cannot be converted into one another by protonation.

The relation to formula (a)

$$0 < \frac{\sum_i z_{K,i} \times n_{K,i}}{\sum_j z_{s,j} \times n_{s,j}} \leq 1 \tag{a}$$

is preferably in the range of 0.1 to 1, more preferably 0.3 to 1, very preferably 0.5 to 0.94, with further preference 0.7 to 0.94, and with more particular preference in the range from 0.8 to 0.9.

The relation to formula (b)

$$0 < \frac{\sum_l z_{A,l} \times n_{A,l}}{\sum_j z_{K,i} \times n_{K,i}} \leq 3 \tag{b}$$

is preferably in the range of 0.01 and 2, more preferably 0.05 to 1.5, very preferably 0.1 to 1.0, with further particular preference 0.15 to 0.8, and with very particular preference in the range from 0.2 to 0.75.

Any range for formula (a) may be combined with any range for formula (b).

A sparingly soluble salt is a salt whose solubility in water under standard conditions of 20° C. and atmospheric pressure is less than 5 g/l, preferably less than 1 g/l.

A water-soluble salt is a salt whose solubility in water under standard conditions of 20° C. and atmospheric pressure is greater than 5 g/l.

The anion is selected from carbonate, oxalate, silicate, phosphate, polyphosphate, phosphite, borate, aluminate and sulfate. The anion is preferably selected from carbonate, silicate, phosphate and aluminate, more preferably the anion is phosphate and more particularly the anion is aluminate.

The stated anions also include the polymeric borate, silicate and oxalate anions, and also the polyphosphates. The term "polymeric anions" refers to anions which as well as oxygen atoms comprise at least two atoms from the group consisting of boron, carbon, silicon and phosphorus. With particular preference they are oligomers having a number of atoms of between 2 and 20, more particularly preferably 2 to 14 atoms, most preferably 2 to 5 atoms. The number of atoms in the case of the silicates is more preferably in the range from 2 to 14 silicon atoms, and in the case of the polyphosphates it is more preferably in the range from 2 to 5 phosphorus atoms.

A compound able to release silicate is $Na_2SiO_3$ and waterglass, with a modulus, defined as the ratio of $SiO_2$ to alkali metal oxide, in the range from 1/1 to 4/1, more preferably 1/1 to 3/1.

With the silicates it is possible for some of the silicon atoms in the silicates to be replaced by aluminum. Such compounds are known from the class of the aluminosilicates. The fraction of aluminum is preferably less than 10 mol %, based on the sum of silicon and aluminum, and more preferably the aluminum fraction is zero.

It has proved to be advantageous if the anion is phosphate or aluminate or a mixture thereof and the relation according to formula (b) is in the range from 0.01 to 2.

It has further proved to be advantageous if the anion is phosphate or aluminate or a mixture thereof and the relation according to formula (b) is in the range from 0.1 to 1.0.

It has proved to be particularly advantageous if the anion is phosphate or aluminate or a mixture thereof and the relation according to formula (b) is in the range from 0.2 to 0.75.

The countercation of the compound which is able to release the anion is preferably a singly charged cation or a proton, preferably an alkali metal cation and/or ammonium ion and/or a proton, more preferably a proton. The ammonium ion may also comprise an organic ammonium ion, examples being alkylammonium ions having one to four alkyl radicals. The organic radical may also be of aromatic type or comprise aromatic radicals. The ammonium ion may also be an alkanolammonium ion.

The additive for hydraulically setting compositions may further comprise at least one neutralizing agent.

The neutralizing agent is preferably an alkali metal hydroxide, an organic monoamine, an organic diamine, an organic polyamine or ammonia. Suitable organic amines are more particularly an aliphatic monoamine, aliphatic diamine or an aliphatic polyamine. Polyamines include triamines.

The neutralizing agent is further preferably selected from sodium hydroxide, potassium hydroxide, ammonia, monohydroxy-$C_1$-$C_4$ alkylamines, dihydroxy-$C_1$-$C_4$ alkylamines, trihydroxy-$C_1$-$C_4$ alkylamines, mono-$C_1$-$C_4$ alkylamines, di-$C_1$-$C_4$ alkylamines, tri-$C_1$-$C_4$ alkylamines, $C_1$-$C_4$ alkylenediamines, (tetrahydroxy-$C_1$-$C_4$ alkyl)-$C_1$-$C_4$ alkylenediamines, polyethylenamines, polypropylenamines and mixtures thereof.

More preferably the neutralizing agent is selected from sodium hydroxide, potassium hydroxide, ammonia, monohydroxy-$C_1$-$C_4$ alkylamines, dihydroxy-$C_1$-$C_4$ alkylamines, trihydroxy-$C_1$-$C_4$ alkylamines, $C_1$-$C_4$ alkylenediamines, polyethylenamines and mixtures thereof.

Particularly preferred neutralizing agents are selected from sodium hydroxide, potassium hydroxide, ammonia, ethylenediamine, monoethanolamine, diethanolamine, triethanolamine, polyethylenamines and mixtures thereof.

Very particularly preferred neutralizing agents are selected from sodium hydroxide and potassium hydroxide and mixtures thereof. Most preferably the neutralizing agent is sodium hydroxide.

The additive for hydraulically setting compositions preferably has a pH of 2 to 11.5, preferably 3 to 10, more particularly 3 to 9.

In one embodiment the polymeric dispersant comprises at least one structural unit of the general formulae (Ia), (Ib), (Ic) and/or (Id), it being possible for the structural units (Ia), (Ib), (Ic) and (Id) to be the same or different both within individual polymer molecules and between different polymer molecules.

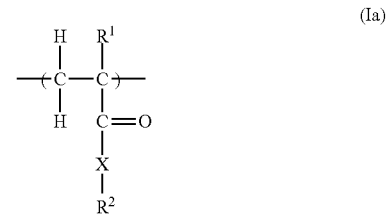

(Ia)

in which $R^1$ is H or an unbranched or branched $C_1$-$C_4$ alkyl group, $CH_2COOH$ or $CH_2CO$—X—$R^3$, preferably H or $CH_3$;

X is NH—$(C_nH_{2n})$, O$(C_nH_{2n})$ with n=1, 2, 3 or 4, where the nitrogen atom or oxygen atom is attached to the CO group, or is a chemical bond, preferably X=chemical bond or O$(C_nH_{2n})$;

$R^2$ is OM, $PO_3M_2$, or O—$PO_3M_2$; with the proviso that X is a chemical bond when $R^2$ is OM;

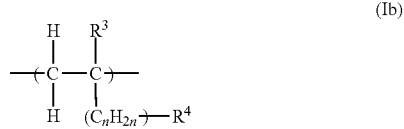

(Ib)

in which $R^3$ is H or an unbranched or branched $C_1$-$C_4$ alkyl group, preferably H or $CH_3$;

n is 0, 1, 2, 3 or 4, preferably 0 or 1;

$R^4$ is $PO_3M_2$, or O—$PO_3M_2$;

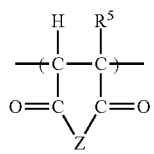
(Ic)

in which
R$^5$ is H or an unbranched or branched C$_1$-C$_4$ alkyl group, preferably H;
Z is O or NR$^7$, preferably O;
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, or (C$_6$H$_4$)—OPO$_3$M$_2$, and
n is 1, 2, 3 or 4, preferably 1, 2 or 3;

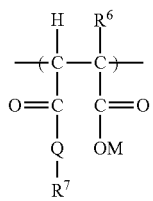
(Id)

in which
R$^6$ is H or an unbranched or branched C$_1$-C$_4$ alkyl group, preferably; Q is NR$^7$ or OH, preferably O;
R$^7$ is H, (C$_n$H$_{2n}$)—OH, (C$_n$H$_{2n}$)—PO$_3$M$_2$, (C$_n$H$_{2n}$)—OPO$_3$M$_2$, (C$_6$H$_4$)—PO$_3$M$_2$, (C$_6$H$_4$)—OPO$_3$M$_2$ or (C$_n$H$_{2n}$)—O-(AO)$_\alpha$—R$^9$,
A is C$_x$H$_{2x}$ with x=2, 3, 4 or 5 or is CH$_2$CH(C$_6$H$_5$);
α is an integer from 1 to 350, preferably 5 to 150;
R$^9$ is H or an unbranched or branched C$_1$-C$_4$ alkyl group;
n is 1, 2, 3 or 4, preferably 1, 2 or 3; and
each M in the abovementioned formulae independently of any other is H or one cation equivalent.

With particular preference, the structural unit of formula Ia is a methacrylic acid or acrylic acid unit, the structural unit of formula Ic is a maleic anhydride unit, and the structural unit of formula Id is a maleic acid or maleic monoester unit.

Where the monomers (I) are phosphoric esters or phosphonic esters, they may also include the corresponding diesters and triesters and also the monoester of diphosphoric acid. These esters come about in general during the esterification of organic alcohols with phosphoric acid, polyphosphoric acid, phosphorus oxides, phosphorus halides or phosphorus oxyhalides, and/or the corresponding phosphonic acid compounds, alongside the monoester, in different proportions, as for example 5-30 mol % of diester and 1-15 mol % of triester and also 2-20 mol % of the monoester of diphosphoric acid.

In one embodiment the polymeric dispersant comprises at least one structural unit of the general formulae (IIa), (IIb), (IIc) and/or (IId). The general formulae (IIa), (IIb), (IIc) and (IId) may be identical or different not only within individual polymer molecules but also between different polymer molecules. All structural units A may be identical or different both within individual polyether side chains and between different polyether side chains.

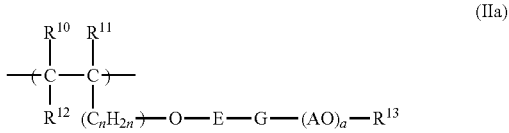
(IIa)

in which
R$^{10}$, R$^{11}$ and R$^{12}$ independently of one another are H or an unbranched or branched C$_1$-C$_4$ alkyl group;
Z is O or S;
E is an unbranched or branched C$_1$-C$_6$ alkylene group, a cyclohexylene group, CH$_2$—C$_6$H$_{10}$, 1,2-phenylene, 1,3-phenylene or 1,4-phenylene;
G is O, NH or CO—NH; or
E and G together are a chemical bond;
A is C$_x$H$_{2x}$ with x=2, 3, 4 or 5, or is CH$_2$CH(C$_6$H$_5$), preferably 2 or 3;
n is 0, 1, 2, 3, 4 or 5, preferably 0, 1 or 2;
a is an integer from 2 to 350, preferably 5 to 150;
R$^{13}$ is H, an unbranched or branched C$_1$-C$_4$ alkyl group, CO—NH$_2$ and/or COCH$_3$;

With particular preference the structural unit of formula IIa is an alkoxylated isoprenyl unit, alkoxylated hydroxybutyl vinyl ether unit, alkoxylated(meth)allyl alcohol unit or a vinylated methylpolyalkylene glycol unit, in each case preferably with an arithmetic average of 4 to 340 oxyalkylene groups.

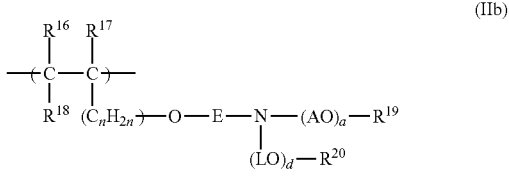
(IIb)

in which
R$^{16}$, R$^{17}$ and R$^{18}$ independently of one another are H or an unbranched or branched C$_1$-C$_4$ alkyl group;
E is an unbranched or branched C$_1$-C$_6$ alkylene group, a cyclohexylene group, CH$_2$—C$_6$H$_{10}$, 1,2-phenylene, 1,3-phenylene, or 1,4-phenylene, or is a chemical bond;
A is C$_x$H$_{2x}$ with x=2, 3, 4 or 5, or is CH$_2$CH(C$_6$H$_5$), preferably 2 or 3;
n is 0, 1, 2, 3, 4 and/or 5, preferably 0, 1 or 2;
L is C$_x$H$_{2x}$ with x=2, 3, 4 or 5, or is CH$_2$—CH(C$_6$H$_5$), preferably 2 or 3;
a is an integer from 2 to 350, preferably 5 to 150;
d is an integer from 1 to 350, preferably 5 to 150;
R$^{19}$ is H or an unbranched or branched C$_1$-C$_4$ alkyl group;
R$^{20}$ is H or an unbranched C$_1$-C$_4$ alkyl group;

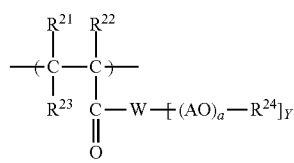
(IIc)

in which
R$^{21}$, R$^{22}$ and R$^{23}$ independently of one another are H or an unbranched or branched C$_1$-C$_4$ alkyl group;

W is O, $NR^{25}$ or is N;
V is 1 if W=O or $NR^{25}$, and is 2 if W=N;
A is $C_xH_{2x}$ with x=2, 3, 4 or 5, or is $CH_2CH(C_6H_5)$, preferably 2 or 3;
a is an integer from 2 to 350, preferably 5 to 150;
$R^{24}$ is H or an unbranched or branched $C_1$-$C_4$ alkyl group; and
$R^{25}$ is H or an unbranched or branched $C_1$-$C_4$ alkyl group;

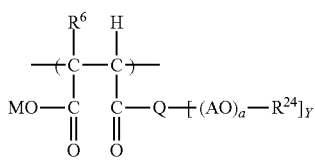
(IId)

in which
$R^6$ is H or an unbranched or branched $C_1$-$C_4$ alkyl group;
Q is $NR^{10}$, N or O;
V is 1 if W=O or $NR^{10}$ and is 2 if W=N;
$R^{10}$ is H or an unbranched or branched $C_1$-$C_4$ alkyl group; and
A is $C_xH_{2x}$ with x=2, 3, 4 or 5, or is $CH_2C(C_6H_5)H$, preferably 2 or 3;
a is an integer from 2 to 350, preferably 5 to 150; and
M is H or one cation equivalent.

Besides the structural units of the formulae (I) and (II), the polymeric dispersant may also comprise further structural units, which derive from radically polymerizable monomers, such as hydroxyethyl(meth)acrylate, hydroxypropyl(meth) acrylate, (meth)acrylamide, ($C_1$-$C_4$)alkyl(meth)acrylates, styrene, styrenesulfonic acid, 2-acrylamido-2-methylpropanesulfonic acid, (meth)allylsulfonic acid, vinylsulfonic acid, vinyl acetate, acrolein, N-vinylformamide, vinylpyrrolidone, (meth)allyl alcohol, isoprenol, 1-butyl vinyl ether, isobutyl vinyl ether, aminopropyl vinyl ether, ethylene glycol monovinyl ether, 4-hydroxybutyl monovinyl ether, (meth)acrolein, crotonaldehyde, dibutyl maleate, dimethyl maleate, diethyl maleate, dipropyl maleate, etc.

The average molecular weight $M_w$ of the polymeric dispersant (comb polymer), preferably of the water-soluble polymeric dispersant, as determined by gel permeation chromatography (GPC) is preferably 5000 to 200 000 g/mol, more preferably 10 000 to 80 000 g/mol, and very preferably 20 000 to 70 000 g/mol. The polymers were analyzed for average molar mass and conversion by means of size exclusion chromatography (column combinations: OH-Pak SB-G, OH-Pak SB 804 HQ and OH-Pak SB 802.5 HQ from Shodex, Japan; eluent: 80% by volume aqueous solution of $HCO_2NH_4$ (0.05 mol/l) and 20% by volume of acetonitrile; injection volume 100 μl; flow rate 0.5 ml/min). Calibration for determining the average molar mass was carried out using linear poly(ethylene oxide) and polyethylene glycol standards. The measure of the conversion is the peak of the copolymer, standardized to a relative height of 1, and the height of the peak of the unreacted macromonomer/PEG-containing oligomer is used as a measure of the residual monomer content.

The polymeric dispersant preferably meets the requirements of the industrial standard EN 934-2 (February 2002).

The polymeric dispersant comprising the structural units (I) and (II) are prepared in a conventional way, by means of radical polymerization, for example. This is described for example in EP0894811, EP1851256, EP2463314, EP0753488.

In one embodiment the polymeric dispersant is a polycondensation product which comprises the structural units (III) and (IV):

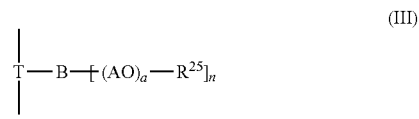
(III)

in which
T is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is $C_xH_{2x}$ with x=2, 3, 4 or 5, or is $CH_2CH(C_6H_5)$;
a is an integer from 1 to 300;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb)

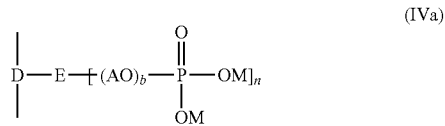
(IVa)

in which
D is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
E is N, NH or O, with the proviso that n is 2 if E is N and with the proviso that n is 1 if E is NH or O;
A is $C_xH_{2x}$ with x=2, 3, 4 or 5, or is $CH_2CH(C_6H_5)$;
b is an integer from 1 to 300;
M independently at each occurrence is H or one cation equivalent; and

(IVb)

in which
V is a substituted or unsubstituted phenyl radical, substituted or unsubstituted naphthyl radical and is optionally substituted by 1 or two radicals selected independently of one another from $R^8$, OH, $OR^8$, $(CO)R^8$, COOM, $COOR^8$, $SO_3R^8$ and $NO_2$, preferably OH, $OC_1$—$C_4$ alkyl and $C_1$-$C_4$ alkyl;
$R^7$ is COOM, $OCH_2COOM$, $SO_3M$ or $OPO_3M_2$;
M is H or one cation equivalent; and
$R^8$ is $C_1$-$C_4$ alkyl, phenyl, naphthyl, phenyl-$C_1$-$C_4$ alkyl or $C_1$-$C_4$ alkylphenyl.

The structural units T and D in the general formulae (III) and (IV) in the polycondensation product are preferably derived from phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, phenoxyacetic acid, salicylic acid, preferably from phenyl, where T and D may be selected independently of one another and may also each be derived from a mixture of the stated radicals. The groups B and E independently of one another are preferably O. All structural units A may be identical or different not only within individual polyether side chains but also between different polyether side chains. In one particularly preferred embodiment, A is $C_2H_4$.

In the general formula (III), a is preferably an integer from 3 to 200 and more particularly 5 to 150, and in the general formula (IV) b is preferably an integer from 1 to 300, more particularly 1 to 50 and more preferably 1 to 10. Furthermore, the radicals of the general formulae (III) or (IV) may independently of one another in each case possess the same chain length, in which case a and b are each represented by a number. In general it will be useful for, in each case, mixtures with different chain lengths to be present, so that the radicals of the structural units in the polycondensation product have different numerical values for a and, independently, for b.

The polycondensation product of the invention frequently has a weight-average molecular weight of 5000 g/mol to 200 000 g/mol, preferably 10 000 to 100 000 g/mol and more preferably 15 000 to 55 000 g/mol.

The molar ratio of the structural units (III):(IV) is typically 4:1 to 1:15 and preferably 2:1 to 1:10. It is advantageous to have a relatively high fraction of structural units (IV) in the polycondensation product, since a relatively high negative charge of the polymers has a good influence on the stability of the aqueous colloidally disperse preparation. The molar ratio of the structural units (IVa):(IVb), when both are present, is typically 1:10 to 10:1 and preferably 1:3 to 3:1.

In a preferred embodiment of the invention the polycondensation product comprises a further structural unit (V), which is represented by the formula below:

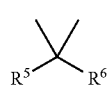

(V)

in which
$R^5$ is H, $CH_3$, COOH or substituted or unsubstituted phenyl or substituted or unsubstituted naphthyl;
$R^6$ is H, $CH_3$, COOH or substituted or unsubstituted phenyl or substituted or unsubstituted naphthyl.

Preferably $R_5$ and $R_6$ are H or one of the radicals $R_5$ and $R_6$ is H and the other is $CH_3$.

$R^5$ and $R^6$ in structural unit (V) are typically identical or different and are H, COOH and/or methyl. Very particular preference is given to H.

In another embodiment the molar ratio of the structural units [(III)+(IV)]:(V) in the polycondensate is 2:1 to 1:3.

The polycondensates are typically prepared by a process which comprises reacting with one another the compounds forming the basis for the structural units (III), (IV) and (V). The preparation of the polycondensates is for example described in WO 2006/042709 and WO 2010/026155.

The monomer with a keto group is preferably an aldehyde or ketone. Examples of monomers of the formula (V) are formaldehyde, acetaldehyde, acetone, glyoxylic acid and/or benzaldehyde. Formaldehyde is preferred.

The polymeric dispersant of the invention may also be present in the form of its salts, such as, for example, the sodium, potassium, organic ammonium, ammonium and/or calcium salt, preferably as the sodium and/or calcium salt.

The additives preferably contain 50% to 90% water and 10% to 50% solid, more preferably 55%-85% water and 15% to 45% solid. The solid here comprises the polymer and also the sparingly soluble salt of the invention The additive of the invention may take the form of an aqueous product in the form of a solution, emulsion or dispersion or in solid form, for example as a powder, after a drying step. The water content of the additive in solid form is in that case preferably less than 10% by weight, more preferably less than 5% by weight. It is also possible for some of the water, preferably up to 10% by weight, to be replaced by organic solvents. Advantageous are alcohols such as ethanol, (iso)propanol and 1-butanol, including its isomers. Acetone can be used as well. By the use of the organic solvents it is possible to influence the solubility and hence the crystallization behavior of the salts of the invention.

The additives of the invention are prepared by contacting the water-soluble salt of the polyvalent metal cation and the polymeric dispersant in an aqueous medium, in solid form or in a polymer melt. Preference is given to using a water-soluble salt of the polyvalent metal cation. The salt of the metal cation may be provided in solid form, or else, expediently, as an aqueous solution or suspension. It is therefore possible to add the polyvalent metal cation salt in the form of a powder, an aqueous solution or else an aqueous suspension to an aqueous solution of a dispersant.

The compound able to release an anion may likewise be used both in solid form (preparation in situ of a solution, or contacting with the polymer melt) or else preferably in the form of an aqueous solution.

An additive of the invention for hydraulically setting compositions may be obtained by precipitating the sparingly soluble salt in the presence of the polymeric dispersant, to give a colloidally disperse preparation of the salt. The precipitation of the sparingly soluble salt here means the formation of colloidally disperse salt particles which are dispersed by the polymeric dispersant and their further coagulation is prevented.

Irrespective of whether the salt of the polyvalent metal cation is precipitated in the presence of the polymeric dispersant or whether a freshly precipitated salt of the polyvalent metal cation is dispersed in the presence of the polymeric dispersant, the additive of the invention for hydraulically setting compositions may also be obtained, alternatively, by additionally admixing the preparation with a neutralizing agent as described above.

An additive of the invention for hydraulically setting compositions may also be obtained by peptizing a hydroxide and/or oxide of the polyvalent metal cation with an acid, to give a colloidally disperse preparation of the salt of the polyvalent metal cation, in which case the acid is selected preferably from boric acid, carbonic acid, oxalic acid, silicic acid, polyphosphoric acid, phosphoric acid and/or phosphorous acid.

The additive is prepared generally by mixing the components, which are preferably in the form of an aqueous solution. In this case it is preferred first to mix the polymeric dispersant (comb polymer) and the polyvalent metal cation salt and then to add the compound able to release the anion which forms a sparingly soluble salt with the polyvalent metal cation. According to another embodiment, the polymeric dispersant (comb polymer) and the compound able to release the anion are mixed first, and then the polyvalent metal cation is added. To adjust the pH it is then possible to add an acid or base. The components are mixed generally at a temperature in the range from 5 to 80° C., usefully 10 to 40° C., and more particularly at room temperature (about 20-30° C.).

An additive of the invention for hydraulically setting compositions may also be obtained by dispersing a freshly precipitated sparingly soluble salt in the presence of the polymeric dispersant, to give a colloidally disperse preparation of the salt. Freshly precipitated here means immediately subsequent to the precipitation, while the salt is substantially amorphous (no more than 30%, preferably no more than 15% crystallinity); i.e. within about five minutes, preferably within one or two minutes, after the precipitation.

Those solids termed "amorphous", are solids whose atomic building blocks are not arranged in crystal lattices, i.e. do not have a long-range order, but instead only have a more or less pronounced close-range order. While crystalline substances exhibit numerous sharp reflections in the diffraction of x-rays, electron beams and neutron beams, amorphous solids exhibit at most a few diffuse interference rings (halos) at small diffraction angles.

The preparation may take place continuously or batchwise. The mixing of the components is accomplished in general in a reactor with a mechanical stirring mechanism. The stirring speed of the stirring mechanism may be between 10 rpm and 2000 rpm. An alternative option is to mix the solutions using a rotor-stator mixer, which may have stirring speeds in the range from 1000 to 30 000 rpm. Furthermore, it is also possible to use different mixing geometries, such as a continuous process in which the solutions are mixed using a Y-mixer, for example.

Optionally, a further step in the method may follow, for the drying of the additive of the invention. Drying may be accomplished by roll drying, spray drying, drying in a fluidized bed process, by bulk drying at elevated temperature, or by other customary drying methods. The preferred range of the drying temperature lies between 50 and 230° C.

The additive of the invention for hydraulically setting compositions may be used as a slump retainer in water-containing building material mixtures which comprise a hydraulic binder, the hydraulic binder being selected from (Portland) cement, slag sand, flyash, silica dust, metakaolin, natural pozzolans, burnt oil shale, calcium aluminate cement or mixtures of two or more of these components.

Additives of the invention can also be prepared by preparing polymeric dispersants with a fraction of polyvalent metal cations >1 according to formula (a) and mixing them with an alkali-neutralized polymeric dispersant in a ratio so as to obtain a fraction of polyvalent metal cations <1 according to formula (a). A variety of mixing sequences are possible in this context. Thus the polymeric dispersant with a fraction of polyvalent metal cations >1 according to formula (a) may be introduced first, and admixed with an alkali-neutralized polymeric dispersant, or vice versa. In this way, furthermore, it is possible to mix different polymeric dispersants. For example, a first alkali-neutralized polymeric dispersant may be mixed with a second polymeric dispersant which has different structural units or a different composition of the structural units from the first polymeric dispersant, and has a fraction of polyvalent metal cations >1 according to formula (a), to give an additive of the invention.

The metering rates of the individual components during the synthesis of the additive of the invention are important parameters. It is particularly preferred for the components to be metered at a high rate. Thus the metering rates typical in the laboratory for the individual components are between 0.01 mL/s and 1000 mL/s. Subject to the proviso of conventional conveying techniques, these parameters can be scaled up to as far as the multi-metric-ton production level, with the upper limit on the metering rate being at least 100 m$^3$/h.

The concept of the slump retainer in this application means that the additives, over a processing life of up to 90 minutes, preferably up to 60 minutes, after the mixing of the building material mixture with water, produce a slump of the binder suspension that is as sufficient as possible for the conditions of the application case in question, is extremely high and in particular does not drop substantially over the aforementioned time period. The additives make it possible to set a profile of properties which is tailored to the respective application. Moreover, it is possible to add the additive not only during mortar or concrete production but instead during production of the cement itself. In that case the additive at the same time fulfills the function of a grinding assistant.

The concrete additives, in addition to the colloidally disperse preparation of the invention, comprising polymeric plasticizer, polyvalent metal cation and anion of the invention, may also comprise further components. These further components include water-reducing plasticizers such as, for example, lignosulfonate, naphthalenesulfonate condensates, sulfonated melamine resins, or conventional polycarboxylate ethers (other than the abovementioned polycarboxylate ethers), and also defoamers, air entrainers, retarders, shrinkage reducers and/or hardening accelerators.

The invention also relates to a building material mixture which comprises at least one additive of the invention and at least one binder. The binder is preferably selected from (Portland) cement, slag sand, flyash, silica dust, metakaolin, natural pozzolans, burnt oil shale, calcium aluminate cement and mixtures thereof. In addition the building material mixture may comprise customary constituents, such as curing accelerators, curing retarders, clay modifiers, shrinkage reducers, corrosion inhibitors, strength enhancers, water reducers, etc.

The addition of additive of the invention amounts in general to 0.1% to 4% by weight as a solid, based on the cement content of the building material mixture. It may be added as an aqueous colloidally disperse preparation or as a dried solid, in the form of a powder, for example.

EXAMPLES

Gel Permeation Chromatography

The sample preparation for the determination of molar weights took place by dissolving the polymer solution in the GPC eluent, to give a polymer concentration in the GPC eluent of 0.5% by weight. Thereafter this solution was filtered through a syringe filter with polyethersulfone membrane and a pore size of 0.45 µm. The injection volume of this filtrate was 50-100 µl.

The average molecular weights were determined on a GPC instrument from Waters with the model name Alliance 2690, with a UV detector (Waters 2487) and an RI detector (Waters 2410).

Columns: Shodex SB-G Guard Column for SB-800 HQ series
Shodex OHpak SB 804HQ and 802.5HQ
(PHM gel, 8×300 mm, pH 4.0 to 7.5)

Eluent: 0.05 M aqueous ammonium formate/methanol mixture=80:20 (parts by volume)
Flow rate: 0.5 ml/min
Temperature: 50° C.
Injection: 50 to 100 µl
Detection: RI and UV The molecular weights of the polymers were determined with two different calibrations. Determination took place first of all relative to polyethylene glycol standards from the company PSS Polymer Standards Service GmbH. The molecular weight distribution curves of the polyethylene glycol standards were determined by means of light scattering. The masses of the polyethylene glycol standards were 682 000, 164 000, 114 000, 57 100, 40 000, 26 100, 22 100, 12 300, 6 240, 3 120, 2 010, 970, 430, 194, 106 g/mol.

Polymer Synthesis

The polymeric dispersant P1 is based on the monomers maleic acid, acrylic acid and vinyloxybutylpolyethylene glycol-5800. The molar ratio of acrylic acid to maleic acid is 7. Mw=40 000 g/mol (determined by GPC). The solids content is 45% by weight. The synthesis of the comb polymer P1 is described in WO 2010/066470 at page 10 line 1 to line 38.

The polymeric dispersant P2 is a condensate of the building blocks PhenolPEG5000 and phenoxyethanol phosphate. The molecular weight is 23 000 g/mol. The synthesis is described in DE102004050395. The solids content is 31%.

Phosphoric Ester-Containing Polymeric Dispersant P3

A glass reactor equipped with stirrer, thermometer, pH electrode and a number of feed ports was charged with 180 g deionized water, and this initial charge was heated to a polymerization starting temperature of 80° C. In a separate feed vessel, 4669 g (240 mmol) of a 25.7% strength aqueous methylpolyethylene glycol (5000) methacrylic ester solution were mixed with 251.8 g (1198 mmol) of hydroxyethyl methacrylate phosphoric ester (HEMA phosphate) and 190.2 g of a 20% strength NaOH solution (corresponding to solution A). In a further separate feed vessel, 13.71 g of sodium peroxodisulfate were mixed with 182.1 g of water (solution B). In a third feed, a 25% strength solution was prepared with 13.2 g of 2-mercaptoethanol and 39.6 g of deionized water (solution C).

Following the preparation of solutions A, B and C, the addition of all three solutions to the stirred initial charge was commenced simultaneously. All of the additions were fed linearly into the initial charge over a period of 60 minutes.

After the end of the addition, the temperature was held at 80° C. for a further 30 minutes, after which the solution was cooled and was neutralized to a pH of 7.3 using 158 g of 50% strength aqueous sodium hydroxide solution. The resulting copolymer was obtained as a clear solution, which had a solids content of 27.8%. The average molecular weight of the copolymer was Mw 39 000 g/mol and Mp 34 000 g/mol, and the polydispersity was 1.55.

The HEMA phosphate used is prepared by mixing polyphosphoric acid with HEMA, the mixture being of 156 g of HEMA and 141.6 g of polyphosphoric acid. This means that the fraction of the pure HEMA phosphate in the reaction mixture is 251.8 g.

Example calculation of the charge density:

$$\frac{\sum_j n_{s,j}}{m_{Polymer}} \text{ copolymerized acid monomers per gram of polymer} =$$

$$\frac{n(\text{number of moles of initial mass of acid monomers in mmol})}{m(\text{mass of polymer solution in g}) \cdot \text{solids content of the polymer solution in \%}}$$

Example calculations for polymer P3 (for initial masses see polymer synthesis):

$$\frac{\sum_j n_{s,j}}{m_{Polymer}} = \frac{(1198 \text{ mmol})}{(5743 \text{ g} \cdot 27.8\%/100)} = 0.75 \text{ mmol/g}$$

Example calculation of formula (a) on the basis of example 7:

The corresponding masses are taken from the table of initial masses: mass of polymer P3 26.1 g and mass of iron nitrate nonahydrate 4.3 g.

Accordingly $$\frac{\sum_i z_{K,i} \times n_{K,i}}{\sum_j z_{s,j} \times n_{s,j}} = \frac{(4.3 \text{ g}/0.404 \text{ g/mmol}) \cdot 3}{(26.1 \text{ g}/0.75 \text{ mmol/g} \cdot 2)}$$

TABLE 1 physical data of the reference polymers

| | P1 | P2 | P3 |
|---|---|---|---|
| $\Sigma_j z_{s,j} \times n_{s,j}$ in mmol per gram of polymer | 0.93 | 0.745 | 1.38 |
| Mw (GPC) | 40 000 | 23 000 | 34 000 |

Examples for the Preparation of the Additives of the Invention

General Instructions:

The aqueous solutions of the polymeric dispersants are mixed in accordance with the invention with the salts of polyvalent metal cations, with the compound able to release the anion, and also, optionally, with a base or acid to adapt the pH, with stirring. Mixing was carried out in a 1 l jacketed glass reactor with paddle stirrer, temperature-conditioned at 20° C., at 300 rpm. The sequence of the addition is indicated in table 2 by a letter code. P stands for the aqueous solution of the polymeric dispersant, K for the inventive salt of the polyvalent metal cation, A for the compound of the invention able to release an anion, and B and S for base and acid, respectively. The amounts are always based on the net contents. The final pH of the resulting solutions or suspensions is likewise indicated.

The solution of the polymeric dispersant is charged to a beaker with magnetic stirrer, and dilution takes place with the stated mass of water (see table 2). Subsequently the salt of the invention of the polyvalent metal cation (for amounts see table) was added and was dissolved with stirring at about 200 rpm, using a magnetic stirrer bar. The compound able to release the anion was added with stirring. Adjustment of the pH, to a pH of 7, takes place optionally, using a base. Viscous suspensions were formed in this procedure.

The suspensions are stable on storage.

Samples of example 12 and example 13 were stored for 6 months each at 20° C. and 4° C., and under atmospheric pressure. In this trial the additives proved to be stable with respect to phase separation and retained their activity as slump retainers.

General Instructions: Spray Drying

The additives of the invention can be converted into powder form by spray drying. In that case the aqueous solutions or suspensions of the additives of the invention are dried using a Mobil Minor spray dryer (from GEA Niro) at an entry temperature of 230° C. and an exit temperature of 80° C. For this purpose the aqueous solutions are first admixed with 1% by weight (based on the solids content of the aqueous solution) of a mixture of Additin RC 7135 LD (Rhein Chemie GmbH) and MPEG500 (50% by weight in each case). The powders obtained are admixed with 1% by weight of finely divided silica (N20P, Wacker Chemie AG), ground using a Retsch Grindomix RM 200 mill at 8000 rpm for 10 seconds and filtered through a 500 μm sieve.

TABLE 2

Composition of the additives

| No. | Polymer | Metal salt | Anion comp. | Base/acid | pH | Sequence |
|---|---|---|---|---|---|---|
| 1 | P2 | $Al(NO_3)_3 \times 9H_2O$ | $H_3PO_4$ | NaOH | 7.2 | PAKB |
| 2 | P2 | $Al(NO_3)_3 \times 9H_2O$ | $H3PO_4$ | NaOH | 7.6 | PAKB |
| 3 | P2 | $Fe(NO_3)_3 \times 9H_2O$ | $H3PO_4$ | $NH_4OH$ | 7.6 | PAKB |
| 4 | P2 | $Fe(NO_3)_3 \times 9H_2O$ | $H_3PO_4$ | $NH_4OH$ | 5.5 | PAKB |
| 5 | P2 | $Ca(NO_3)_2$ | $H_3PO_4$ | NaOH | 7.0 | PAKB |
| 6 | P2 | $Ca(NO_3)_2$ | $H_3PO_4$ | NaOH | 6.7 | PAKB |
| 7 | P3 | $Fe(NO_3)_3 \times 9H_2O$ | $H_3PO_4$ | $NH_4OH$ | 5.4 | PAKB |
| 8 | P1 | $Ca(NO_3)_2$ | $H_3PO_4$ | NaOH | 10.5 | PAKB |
| 9 | P3 | $Fe(NO_3)_3 \times 9H_2O$ | $H_3PO_4$ | $NH_4OH$ | 3.7 | PAKB |
| 10 | P3 | $Ca(NO_3)_2$ | $H_3PO_4$ | — |  | PAKB |
| 11 | P1 | $Fe(NO_3)_3 \times 9H_2O$ | $H_3PO_4$ | — | 11 | PAK |
| 12* | P2 | $Al(NO_3)_3 \times 9H_2O$ | $H_3PO_4$ | — | 3.8 | PAK |
| 13* | P2 | $Al(NO_3)_3 \times 9H_2O$ | $H_3PO_4$ | — | 6.2 | PAK |
| 14 | P3** | $Ca(NO_3)_2$ | $H_3PO_4$ | NaOH | 8.8 | PKAB |
| 15 | P2** | $Ca(NO_3)_2$ | $H_3PO_4$ | NaOH | 8.4 | PKAB |
| 16 | P1 | $Fe(NO_3)_3 \times 9H_2O$ | $H_3PO_4$ | NaOH | 6.0 | PKAB |
| 17 | P1 | $Ca(NO_3)_2$ | $H_3PO_4$ | NaOH | 8.6 | PKAB |
| 18*** | P1 | $Ca(NO_3)_2$ | $H_3PO_4$ | NaOH | 9 | PKAB |
| 19 | 50% 18 + 50% P1 | $Ca(NO_3)_2$ | $H_3PO_4$ |  |  |  |
| 20 | 40% 18 + 60% P1 | $Ca(NO_3)_2$ | $H_3PO_4$ |  |  |  |
| 21# | P1 | $Ca(NH_2SO_3)_2$ | $H_3PO_4$ | NaOH | 9 | PKAB |
| 22 | P1 | $Ca(NO_3)_2$ | $NaAlO_2$ | $HNO_3$ | 10.5 | PAKB |
| 23 | P2** | $Ca(NO_3)_2$ | $NaAlO_2$ | NaOH | 10.3 | PAKB |
| 24 | P2** | $Ca(NO_3)_2$ | $NaAlO_2$ | NaOH | 10.3 | PAKB |

| No. | Water (% by wt.) | Polymer (% by wt.) | Metal salt (% by wt.) | Anion comp. (% by wt.) | Base/acid (% by wt.) | $\dfrac{\sum_i z_{K,i} * n_{K,i}}{\sum_j z_{S,j} * n_{S,j}}$ | $\dfrac{\sum_l z_{A,l} \times n_{A,l}}{\sum_j z_{K,i} \times n_{K,i}}$ |
|---|---|---|---|---|---|---|---|
| 1 | 64 | 33.6 | 1.5 | 0.6 | 0.4 | 0.47 | 1.25 |
| 2 | 64 | 32.9 | 2.4 | 0.5 | 0.6 | 0.78 | 0.75 |
| 3 | 63.6 | 33.8 | 1.6 | 0.6 | 0.4 | 0.47 | 1.25 |
| 4 | 63.6 | 33.7 | 1.6 | 0.6 | 0.5 | 0.47 | 1.25 |
| 5 | 63.4 | 33.7 | 2.1 | 0.6 | 0.2 | 0.52 | 1.12 |
| 6 | 62.5 | 32.9 | 3.7 | 0.5 | 0.3 | 0.94 | 0.62 |
| 7 | 68.0 | 26.1 | 4.3 | 1.4 | 0.3 | 0.81 | 1.02 |
| 8 | 74.1 | 23.5 | 1.6 | 0.3 | 0.5 | 0.89 | 0.38 |
| 9 | 70.0 | 24.3 | 4.4 | 0.9 | 0.4 | 0.95 | 0.72 |
| 10 | 72.3 | 23.8 | 2.5 | 0.8 | 0.5 | 0.92 | 0.74 |
| 11 | 74 | 24.2 | 1.5 | 0.3 |  | 0.94 | 0.36 |
| 12* | 76.5 | 21.3 | 1.8 | 0.4 |  | 0.92 | 0.64 |
| 13* | 77.4 | 21.6 | 0.9 | 0.4 |  | 0.47 | 1.25 |
| 14 | 72.3 | 24.3 | 2.6 | 0.3 | 0.6 | 0.92 | 0.23 |
| 15 | 73.4 | 25.4 | 0.8 | 0.1 | 0.3 | 0.52 | 0.38 |
| 16 | 73.2 | 24.2 | 2.0 | 0.3 | 0.3 | 0.67 | 0.5 |
| 17 | 74.0 | 23.1 | 1.6 | 0.6 | 0.8 | 0.89 | 0.75 |
| 18*** | 73.3 | 22.6 | 2.6 | 0.5 | 0.8 | 1.48 | 0.45 |
| 19 |  |  |  |  |  | 0.74 | 0.22 |
| 20 |  |  |  |  |  | 0.59 | 0.18 |
| 21# |  | 88.6 | 8.6 | 0.9 | 0.5 | 0.89 | 0.38 |
| 22 | 76.1 | 21.4 | 1.5 | 0.95 | 0.05 | 0.9 | 0.67 |
| 23 | 77 | 20.4 | 1.5 | 1 | 0.1 | 0.9 | 0.67 |
| 24 | 77.5 | 20.5 | 1.5 | 0.5 | 0.3 | 0.9 | 0.33 |

*Samples 6 months old;
**: dialyzed sample to remove phosphate from monomer solution;
***noninventive example;
: spray-dried sample Concrete Tests Concrete tests conducted were standard concrete tests in accordance with DIN EN 12350 with a cement content of 380 kg. The grading curve set corresponds to the NB 16 classification according to DIN 1045-2.

The cements used were Karlstadt CEM I 42.5 R, with a w/c value of 0.47, and Bernburg CEM I 42.5 R, with a w/c of 0.44.

Prior to testing in the concrete, the polymer samples were defoamed with 1% by weight of triisobutyl phosphate, based on the polymer solids content.

Mixing Process

The dried aggregates as per grading curve, and the cement, were introduced into a forced mixer and mixed for 10 seconds. The mixture in the forced mixer was thereafter moistened with 10% of the total water, and mixing was continued for a further 2 minutes. Then the remainder of the water was added, and mixing was continued for 1 minute more. Lastly the additive was added, followed by mixing for 1 minute again.

The slump value is a measure of the extent to which the concrete cake collapses after the metal cone is lifted (difference in height between the top edge of the metal cone and the height of the concrete cake after removal of the metal mold). The slump flow corresponds to the base diameter of the concrete cake after collapse.

The spread is obtained by shaking the slump flow board, in accordance with the abovementioned DIN method, by raising and impacting 15 times. The shearing forces which occur as a result of the tapping produce a further spread of the concrete. The diameter of the concrete cake after tapping is identified as the spread.

The levels of addition indicated (Dos. %) are based on the solids content of the additives employed.

(w/c 0.44) and Bernburg CEM I 42.5 R (w/c 0.42). The weight ratio of sand to cement was 2.2 to 1. A mixture of 70% by weight standard sand (Normensand GmbH, D-59247 Beckum) and 30% by weight silica sand was used. Prior to testing in the mortar, the additive samples were defoamed with 1% by weight of triisobutyl phosphate, based on the polymer solids content.

Mixing Process

Cement is added to the initial charge of water. This defines the time point Os. Stirring is then carried out on setting 1 for 30 s. After that the sand is added and stirring continues for a further 30 s at setting 1 (140 rpm) and a further 30 s at setting 2 (285 rpm). The stirring is then discontinued for 90 s. In this time interval the plasticizer (either as an aqueous preparation or as a powder) is added. If the aqueous plasticizer preparation is added, then the added water is subjected accordingly from the amount of the batching water. Lastly, stirring takes place again on setting 2 for 60 s. After a total mixing time which is therefore 4 minutes, the first spread is ascertained.

The spread was obtained by shaking the slump flow table, in accordance with the abovementioned DIN method, by raising and impacting it 15 times (tapping). The diameter of the mortar cake after tapping is identified as the spread.

Delta identifies the difference in the spread with inventive additive relative to the spread in a comparative mortar test. In comparative mortar tests, the polymeric dispersant present in the additive of the invention was used as additive in each case.

The levels of addition indicated are based on the solids content of the polymer suspensions employed.

TABLE 3

Results of the concrete tests, cement: Bernburg CEM I 42.5 R, w/c = 0.44

| Ex. | Additive | Dos % | Air % | Slump in cm 0 min | Slump in cm 10 min | Slump in cm 30 min | Slump in cm 60 min | Slump flow in cm 0 min | Slump flow in cm 10 min | Slump flow in cm 30 min | Slump flow in cm 60 min | Spread in cm 0 min | Spread in cm 10 min | Spread in cm 30 min | Spread in cm 60 min | Delta spread relative to the base polymer 10-0 min | Delta spread relative to the base polymer 30-0 min | Compressive strength MPa 24 h |
|---|---|---|---|---|---|---|---|---|---|---|---|---|---|---|---|---|---|---|
| C1 | P1 | 0.11 | 2.9 | 20.5 | 8.0 | 2.0 | | 33.0 | 21.0 | 20.0 | | 56.0 | 45.0 | 36.5 | | | | 25.60 |
| 19 | Mixture 40% by wt. 18/60% by wt. P1 | 0.15 | 2.2 | 21.0 | 20.0 | 5.5 | 1.0 | 35.0 | 31.5 | 21.0 | 20.0 | 57.5 | 54.5 | 41.0 | 34.0 | +9.5 | +4.5 | |
| 20 | Mixture 50% by wt. 18/50% by wt. P1 | 0.17 | 1.8 | 22.0 | 22.0 | 8.0 | 1.5 | 37.0 | 36.5 | 22.0 | 20.0 | 57.5 | 57.5 | 45.0 | 36.0 | +12.5 | +8.5 | 29.7 |
| 8 | P1 | 0.17 | 1.8 | 17.0 | 22.5 | 15.0 | 2.5 | 29.0 | 41.0 | 27.5 | 20.5 | 54.0 | 60.0 | 51.5 | 41.0 | +15.0 | +15.0 | 28.1 |

Applications Tests

Mortar Tests

Mortar tests used were standard mortar tests in accordance with DIN EN 1015-3 using Karlstadt CEM I 42.5 R

TABLE 4

Mortar results, Karlstadt cement, w/c 0.44

| Additive No. | Basis polymer | Dos. [%] | Spread [cm] 4 min | 10 min | 30 min | 60 min | 90 min | Delta [cm] |
|---|---|---|---|---|---|---|---|---|
| P1 | | 0.105 | 25.4 | 24.6 | 22.1 | 20.7 | | |
| P2 | | 0.16 | 24.6 | 25.4 | 23.2 | 21.9 | 20.5 | |
| P3 | | 0.14 | 23.2 | 22.3 | 20.9 | 20.3 | | |
| 1 | P2 | 0.17 | 22.8 | 24.1 | 23.2 | 22.3 | 21.2 | +0.7 (90 min) |
| 2 | P2 | 0.20 | 23 | 24.8 | 24.3 | 23.2 | 22.2 | +1.7 (90 min) |
| 3 | P2 | 0.19 | 22.5 | 23.4 | 23.2 | 22.1 | 21.4 | +0.9 (90 min) |
| 4 | P2 | 0.265 | 21.3 | 23.2 | 24.1 | 24.5 | 24.2 | +3.7 (90 min) |
| 5 | P2 | 0.20 | 22.9 | 25.7 | 25.4 | 24.7 | 23.3 | +2.8 (90 min) |
| 6 | P2 | 0.34 | 21.2 | 23.1 | 23.6 | 22.9 | 21.7 | +1.2 (90 min) |

TABLE 4-continued

Mortar results, Karlstadt cement, w/c 0.44

| Additive No. | Basis polymer | Dos. [%] | Spread [cm] 4 min | 10 min | 30 min | 60 min | 90 min | Delta [cm] |
|---|---|---|---|---|---|---|---|---|
| 7  | P3 | 0.14 | 22.4 | 24.2 | 24.7 | 24.6 | 23.8 | +4.3 (60 min) |
| 8  | P1 | 0.15 | 24.6 | 25.7 | 26.3 | 26.7 | 25.8 | +6.0 (60 min) |
| 11 | P1 | 0.14 | 22.8 | 24.3 | 24.2 | 24.7 | 24.4 | +4.0 (60 min) |
| 9  | P3 | 0.23 | 21.2 | 23.4 | 27.5 | 28.3 | 27.4 | +8.0 (60 min) |
| 10 | P3 | 0.22 | 21.2 | 22.3 | 23.8 | 24.2 | 23.4 | +3.9 (60 min) |
| 12 | P2 | 0.26 | 20   | 22.5 | 24.2 | 24.8 | 24.7 | +4.2 (90 min) |
| 13 | P2 | 0.22 | 24.3 | 28.2 | 27.8 | 28   | 27.3 | +6.8 (90 min) |

TABLE 5

Mortar results, Bernburg cement, w/c 0.42

| Additive No. | Basis polymer | Dos. [%] | Spread [cm] 4 min | 10 min | 30 min | 60 min | 90 min | Delta [cm] 30 min |
|---|---|---|---|---|---|---|---|---|
| P1  |     | 0.105  | 25.4 | 20.5 | 18.2 |      |      |      |
| P2  |     | 0.165% | 26.2 | 24.8 | 20.7 |      |      |      |
| P3  |     | 0.14%  | 24.4 | 22.1 | 19.2 |      |      |      |
| 4   | P2  | 0.26%  | 21.8 | 23.1 | 22   | 20.7 |      | +1.3 |
| 6   | P2  | 0.30%  | 24.3 | 23.4 | 21.6 | 20.7 |      | +0.9 |
| 7   | P1  | 0.14%  | 23.7 | 22.6 | 20.5 |      |      | +2.3 |
| 14  | P3  | 0.18%  | 19.4 | 22.4 | 26.3 | 24.8 | 24.1 | +7.1 |
| 15  | P2  | 0.20%  | 26.3 | 26.6 | 23.8 | 21.9 | 20   | +3.1 |
| 16  | P1  | 0.14%  | 25.3 | 24.5 | 22.7 | 21.1 | 19.3 | +4.5 |
| 17  | P1  | 0.17%  | 26.4 | 25.6 | 24.7 | 22.7 | 21.1 | +6.5 |
| 21* | P1  | 0.15%  | 25.8 | 24   | 21.6 |      |      | +3.4 |
| 22  | P1  | 0.15%  | 20.4 | 22.1 | 23.1 | 21.7 | 20.1 | +2.4 |
| 23  | P2**| 0.35   | 24.3 | 26.9 | 27.2 | 25.6 | 24.0 | +6.5 |
| 24  | P2**| 0.28   | 24.7 | 26.1 | 24.8 | 23.2 | 21.3 | +4.1 |

*: Inventive additive in powder form
**: dialyzed sample to remove phosphate from monomer solution As the mortar results show, the additives of the invention comprehensively result in longer retention of consistency, as compared with the unmodified polymeric dispersants.

The invention claimed is:

1. Additive for hydraulically setting compositions, comprising a colloidally disperse preparation of at least one water-soluble salt of a polyvalent metal cation, at least one compound able to release an anion which forms a sparingly soluble salt with the polyvalent metal cation, and at least one polymeric dispersant which comprises anionic and/or anionogenic groups and polyether side chains, the polyvalent metal cation being selected from $Al^{3+}$, $Fe^{3+}$, $Fe^{2+}$, $Zn^{2+}$, $Mn^{2+}$, $Cu^{2+}$, $Mg^{2+}$, $Ca^{2+}$, $Sr^{2+}$, $Ba^{2+}$ and mixtures thereof, the metal cation being present in an amount such that the following relation according to formula (a) is greater than 0 and less than or equal to 1:

$$0 < \frac{\sum_i z_{K,i} \times n_{K,i}}{\sum_j z_{s,j} \times n_{s,j}} \leq 1 \quad (a)$$

and where $z_{K,i}$ is the amount of the charge number of the polyvalent metal cation, $n_{K,i}$ is the number of moles of the polyvalent metal cation, $z_{S,j}$ is the amount of the charge number of the anionic and anionogenic group present in the polymeric dispersant, and $n_{S,j}$ is the number of moles of the anionic and anionogenic group present in the polymeric dispersant, the indices i and j are independent of one another and are an integer greater than 0, where i is the number of different polyvalent metal cations and j is the number of different anionic and anionogenic groups present in the polymeric dispersant.

2. The additive according to claim 1, the polyvalent metal cation and the anion being present in amounts which are calculated according to the following formulae:

$$0 < \frac{\sum_i z_{K,i} \times n_{K,i}}{\sum_j z_{s,j} \times n_{s,j}} \leq 1 \quad (a)$$

$$0 < \frac{\sum_i z_{A,l} \times n_{A,l}}{\sum_i z_{K,i} \times n_{K,i}} \leq 3 \quad (b)$$

where $z_{K,i}$ is the amount of the charge number of the polyvalent metal cation, $n_{K,i}$ is the number of moles of the polyvalent metal cation, $z_{S,j}$ is the charge number of the anionic and anionogenic groups present in the polymeric dispersant, $n_{S,j}$ is the number of moles of the anionic and anionogenic groups present in the polymeric dispersant, $z_{A,l}$ is the charge number of the anion,
$n_{A,l}$ is the number of moles of the anion,
the indices i, j and I are independent of one another and are an integer greater than 0, where i is the number of different polyvalent metal cations, j is the number of different anionic and anionogenic groups present in the polymeric dispersant, and I is the number of different anions which are able to form a sparingly soluble salt with the metal cation.

3. The additive according to claim 1, the anion being selected from carbonate, oxalate, silicate, phosphate, polyphosphate, phosphite, borate, aluminate, sulfate and mixtures thereof.

4. The additive according to claim 1, the anion being phosphate and/or aluminate.

5. The additive according to claim 1, the metal cation being selected from $Al^{3+}$, $Fe^{3+}$, $Ca^{2+}$ and mixtures thereof.

6. The additive according to claim 1, the polyvalent metal cation and the anion being present in amounts which are calculated according to the following formula:

$$0.25 < \frac{(\sum_i z_{K,i} \times n_{K,i})^2}{(\sum_l z_{A,l} \times n_{A,l})(\sum_j z_{s,j} \times n_{s,j})} < 25. \qquad (c)$$

7. The additive according to claim 1, having a pH of 2 to 11.5.

8. The additive according to claim 1, the polymeric dispersant comprising as anionic or anionogenic group at least one structural unit of the general formulae (Ia), (Ib), (Ic) and/or (Id):

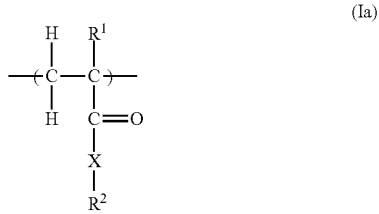
(Ia)

in which
$R^1$ is H or an unbranched or branched $C_1$-$C_4$ alkyl group, $CH_2COOH$ or $CH_2CO$—X—$R^2$;
X is NH—$(C_nH_{2n})$, $O(C_nH_{2n})$ with n=1, 2, 3 or 4, the nitrogen atom or the oxygen atom, respectively, being attached to the CO group, or is a chemical bond;
$R^2$ is OM, $PO_3M_2$, or O—$PO_3M_2$; with the proviso that X is a chemical bond when $R^2$ is OM;

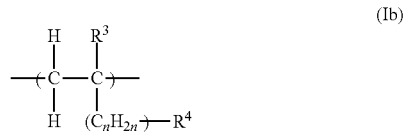
(Ib)

in which
$R^3$ is H or an unbranched or branched $C_1$-$C_4$ alkyl group;
n is 0, 1, 2, 3 or 4;
$R^4$ is $PO_3M_2$, or O—$PO_3M_2$;

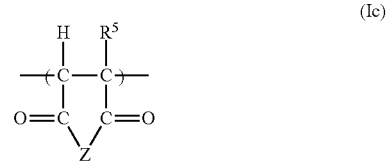
(Ic)

in which
$R^5$ is H or an unbranched or branched $C_1$-$C_4$ alkyl group;
Z is O or $NR^7$; and
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4;

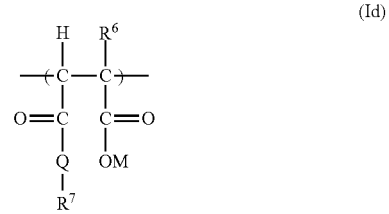
(Id)

in which
$R^9$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, $(C_6H_4)$—$OPO_3M_2$ or $(C_nH_{2n})$—O-$(AO)_\alpha$—$R^9$,
A is $C_xH_{2x}$ with x=2, 3, 4 or 5 or is $CH_2CH(C_6H_5)$;
$\alpha$ is an integer from 1 to 350;
$R^9$ is H or an unbranched or branched $C_1$-$C_4$ alkyl group;
n is 1, 2, 3 or 4; and
each M in the abovementioned formulae independently of any other is H or one cation equivalent.

9. The additive according to claim 1, the polymeric dispersant comprising as polyether side chain at least one structural unit of the general formulae (IIa), (IIb), (IIc) and/or (IId):

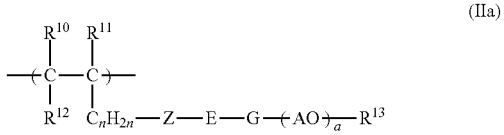
(IIa)

in which
$R^{10}$, $R^{11}$ and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is $C_xH_{2x}$ with x=2, 3, 4 or 5 or is $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, CO—$NH_2$ and/or $COCH_3$;

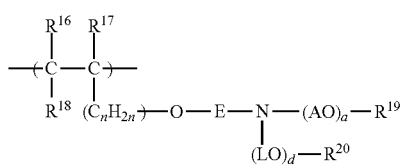 (IIb)

in which
$R^{15}$, $R^{17}$ and $R^{18}$ independently of one another are H or an unbranched or branched $C_1$-$C_4$ alkyl group;
E is an unbranched or branched $C_1$-$C_5$ alkylene group, a cyclohexylene group, $CH_2$—$C_8H_{10}$, 1,2-phenylene, 1,3-phenylene or 1,4-phenylene or is a chemical bond;
A is $C_xH_{2x}$ with x=2, 3, 4 or 5 or is $CH_2CH(C_6H_5)$;
L is $C_xH_{2x}$ with x=2, 3, 4 or 5 or is $CH_2$—$CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched $C_1$-$C_4$ alkyl group; and
n is 0, 1, 2, 3, 4 or 5;

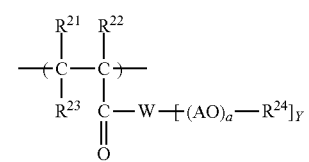 (IIc)

in which
$R^{21}$, $R^{22}$ and $R^{23}$ independently of one another are H or an unbranched or branched $C_1$-$C_4$ alkyl group;
W is O, $NR^{25}$ or N
Y is 1, if W=O or $NR^{25}$, and is 2 if W=N;
A is $C_xH_{2x}$ with x=2, 3, 4 or 5 or is $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

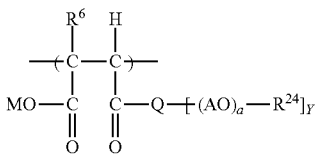 (IId)

in which
$R^6$ is H or an unbranched or branched $C_1$-$C_4$ alkyl group;
Q is $NR^{16}$, N or O;
Y is 1 if Q=O or $NR^{10}$, and is 2 if Q=N;
$R^{10}$ is H or an unbranched or branched $C_1$-$C_4$ alkyl group;
$R^{24}$ is H or an unbranched or branched $C_1$-$C_4$ alkyl group;
A is $C_xH_{2x}$ with x=2, 3, 4 or 5, or $CH_2C(C_6H_5)H$;
a is an integer from 2 to 350; and
M is H or one cation equivalent.

10. The additive according to claim 1, the polymeric dispersant being a polycondensation product comprising structural units (III) and (IV):

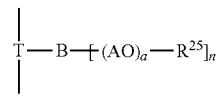 (III)

in which
T is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and the proviso that n is 1 if B is NH or O;
A is $C_xH_{2x}$ with x=2, 3, 4 or 5 or is $CH_2CH(C_6H_5)$;
a is an integer from 1 to 300;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
the structural unit (IV) being selected from the structural units (IVa) and (IVb):

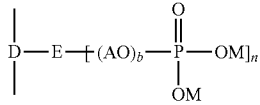 (IVa)

in which
D is a substituted or unsubstituted phenyl radical, substituted or unsubstituted naphthyl radical or a substituted or unsubstituted heteroaromatic radical having 5 to 10 ring atoms, of which 1 or 2 atoms are heteroatoms selected from N, O and S;
E is N, NH or O, with the proviso that n is 2 if E is N and with the proviso that n is 1 if E is NH or O;
A is $C_xH_{2x}$ with x=2, 3, 4 or 5 or is $CH_2CH(C_6H_5)$;
b is an integer from 1 to 300;
M independently at each occurrence is H or one cation equivalent;

 (IVb)

in which
V is a substituted or unsubstituted phenyl radical, substituted or unsubstituted naphthyl radical and is optionally substituted by 1 or two radicals selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is H or one cation equivalent; and
$R^8$ is $C_1$-$C_4$ alkyl, phenyl, naphthyl, phenyl-$C_1$-$C_4$ alkyl or $C_1$-$C_4$ alkylphenyl.

11. The additive according to claim 1, obtained by precipitating the salt of the polyvalent metal cation in the presence of the polymeric dispersant, to give a colloidally disperse preparation of the salt, or
obtained by dispersing a freshly precipitated salt of the polyvalent metal cation in the presence of the polymeric dispersant, to give a colloidally disperse preparation of the salt.

12. The additive according to claim 1 in the form of a powder.

13. A building material mixture comprising an additive according to claim 1 and a binder selected from (Portland) cement, slag sand, flyash, silica dust, metakaolin, natural pozzolans, burnt oil shale, calcium aluminate cement, and mixtures thereof.

14. The additive according to claim 8, wherein X is a chemical bond or $O(C_nH_{2n})$.

15. A process for preparing the additive for hydraulically setting compositions according to claim 1, comprising a step wherein the salt of the polyvalent metal cation is precipitated in the presence of the polymeric dispersant, to give a colloidally disperse preparation of the salt, or a freshly precipitated salt of the polyvalent metal cation is dispersed in the presence of the polymeric dispersant, to give a colloidally disperse preparation of the salt, and optionally a drying step.

16. A process comprising adding the additive according to claim 1 as a slump retainer in water-containing building material mixtures which comprise a hydraulic binder.

17. The process according to claim 16, the hydraulic binder being selected from (Portland) cement, slag sand, flyash, silica dust, metakaolin, natural pozzolans, burnt oil shale, calcium aluminate cement, and mixtures of two or more thereof.

* * * * *

UNITED STATES PATENT AND TRADEMARK OFFICE
CERTIFICATE OF CORRECTION

PATENT NO. : 9,777,133 B2
APPLICATION NO. : 14/770297
DATED : October 3, 2017
INVENTOR(S) : Gadt et al.

Page 1 of 1

It is certified that error appears in the above-identified patent and that said Letters Patent is hereby corrected as shown below:

In the Claims

In Claim 2 (Column 33, Lines 3 and 7), the alphabetical symbol for the number of different anions which are able to form a sparingly soluble salt with the metal cation is incorrect.
Line 3 should read:
The indices i, j, and l are independent of one another and
Line 7 should read:
polymeric dispersant, and l is the number of different In Claim 8 (Column 35, Line 28), the chemical recitation represented by general formula (Id) is incorrect. The recitation should read:
$R^6$ is H or an unbranched or branched $C_1$-$C_4$ alkyl group;

In Claim 9 (Column 35, Lines 11, 14), the chemical recitation represented by general formula (IIb) is incorrect. The recitation should read:
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2$-$C_6H_{10}$, 1,2-phenylene, 1,3-phenylene or 1,4-phenylene or is a chemical bond;

In Claim 9 (Column 35, Line 57), the chemical recitation represented by general formula (IId) is incorrect. The recitation should read:
in which
$R^6$ is H or an unbranched or branched $C_1$-$C_4$ alkyl group;
Q is $NR^{10}$, N or O;

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*